(12) United States Patent
Bassani

(10) Patent No.: US 10,577,186 B2
(45) Date of Patent: Mar. 3, 2020

(54) CONTAINER FILLING MACHINE

(71) Applicant: COUNTLAB, INC., Montreal (CA)

(72) Inventor: Loris Bassani, Montreal (CA)

(73) Assignee: COUNTLAB, INC., Montreal (CA)

( * ) Notice: Subject to any disclaimer, the term of this patent is extended or adjusted under 35 U.S.C. 154(b) by 627 days.

(21) Appl. No.: 14/150,604

(22) Filed: Jan. 8, 2014

(65) Prior Publication Data

US 2014/0116571 A1     May 1, 2014

Related U.S. Application Data

(63) Continuation of application No. 13/212,903, filed on Aug. 18, 2011, now abandoned.

(51) Int. Cl.
| | | |
|---|---|---|
| *B65B 1/08* | (2006.01) |
| *B65G 27/16* | (2006.01) |
| *B65G 27/22* | (2006.01) |
| *B65G 27/04* | (2006.01) |
| *B65B 57/20* | (2006.01) |
| *B65B 5/10* | (2006.01) |

(52) U.S. Cl.
CPC ................ *B65G 27/22* (2013.01); *B65B 1/08* (2013.01); *B65B 5/103* (2013.01); *B65B 57/20* (2013.01); *B65G 27/04* (2013.01)

(58) Field of Classification Search
CPC ....... B65B 39/00; B65B 39/007; B65B 39/12; B65B 1/08; B65G 27/00; B65G 27/16; B65G 27/32; B65G 41/002
USPC ........... 53/255; 198/752.1, 764, 774.2, 774.4
See application file for complete search history.

(56) References Cited

U.S. PATENT DOCUMENTS

| | | | |
|---|---|---|---|
| 1,383,623 A | 7/1921 | Groves |
| 2,845,759 A | 8/1958 | Cote et al. |
| 3,028,713 A | 4/1962 | Kennedy et al. |
| 3,081,588 A | 3/1963 | Klapes et al. |
| 3,139,713 A | 7/1964 | Merrill et al. |

(Continued)

FOREIGN PATENT DOCUMENTS

| | | |
|---|---|---|
| CA | 2060784 A1 | 8/1992 |
| CA | 2321725 A1 | 9/1999 |

(Continued)

OTHER PUBLICATIONS

International Search Report issued by the Canadian Intellectual Property Office dated Nov. 9, 2007 in connection with International Patent Application Serial No. PCT/CA2007/000238, 6 pages.

(Continued)

*Primary Examiner* — Gloria R Weeks
(74) *Attorney, Agent, or Firm* — Amster, Rothstein & Ebenstein LLP

(57) ABSTRACT

A vibration tray assembly for use in a container filling machine, the vibration tray assembly comprising a tray for transporting discrete articles from a receiving end of the tray towards a drop-off end of the tray, the tray providing a slope along which the discrete articles travel from the receiving end of the tray to the drop-off end of the tray, wherein the tray is adjustable for changing the slope along which the discrete articles travel. The vibration tray assembly further comprises a vibration imparting device for imparting vibrational motion to the tray.

6 Claims, 10 Drawing Sheets

(56) References Cited

U.S. PATENT DOCUMENTS

| | | | |
|---|---|---|---|
| 3,557,688 A * | 1/1971 | Hartbauer | B65B 13/20 |
| | | | 100/218 |
| 3,677,437 A | 7/1972 | Haigler | |
| 3,746,211 A | 7/1973 | Burgess, Jr. | |
| 3,917,050 A | 11/1975 | Gregor | |
| 3,925,960 A | 12/1975 | Saari et al. | |
| 3,940,908 A * | 3/1976 | Dazen | G21C 21/08 |
| | | | 376/261 |
| 3,958,687 A | 5/1976 | Adams et al. | |
| 4,102,449 A * | 7/1978 | Shufran | B21B 43/02 |
| | | | 198/774.4 |
| 4,118,295 A | 10/1978 | Korenowski et al. | |
| 4,118,878 A | 10/1978 | Semon | |
| 4,146,123 A | 3/1979 | Cottrell | |
| 4,408,295 A | 10/1983 | Kavage et al. | |
| 4,461,363 A | 7/1984 | Loy | |
| 4,680,464 A | 7/1987 | Bross | |
| 4,922,181 A | 5/1990 | Pullan | |
| 4,924,955 A | 5/1990 | Dauge | |
| 4,932,559 A | 6/1990 | Stein | |
| 4,943,227 A | 7/1990 | Facchini | |
| 4,967,540 A * | 11/1990 | Coppolani | B65B 25/04 |
| | | | 53/502 |
| 5,052,167 A * | 10/1991 | Scharch | B65B 19/34 |
| | | | 198/761 |
| 5,136,826 A | 8/1992 | Carson et al. | |
| 5,200,013 A | 4/1993 | Traber | |
| 5,238,124 A | 8/1993 | Canè et al. | |
| 5,333,778 A | 8/1994 | Specker | |
| 5,439,036 A | 8/1995 | Krämer | |
| 5,463,839 A | 11/1995 | Stange et al. | |
| 5,489,019 A | 2/1996 | DiNanno et al. | |
| 5,558,199 A | 9/1996 | Roether | |
| 5,585,732 A | 12/1996 | Steele et al. | |
| 5,596,865 A | 1/1997 | Krämer | |
| 5,737,902 A | 4/1998 | Aylward | |
| 5,931,286 A | 8/1999 | Illi | |
| 5,950,404 A | 9/1999 | Meyer et al. | |
| 5,967,294 A | 10/1999 | Patterson et al. | |
| 6,185,901 B1 | 2/2001 | Aylward | |
| 6,266,946 B1 | 7/2001 | Aylward | |
| 6,269,612 B1 | 8/2001 | Aylward | |
| 6,401,429 B2 | 6/2002 | Aylward | |
| 6,494,022 B1 | 12/2002 | Aylward | |
| 6,504,387 B1 | 1/2003 | Shail et al. | |
| 6,505,460 B2 | 1/2003 | Aylward | |
| 6,625,955 B2 | 9/2003 | Aylward | |
| 6,631,799 B2 | 10/2003 | Samson | |
| 6,640,842 B1 | 11/2003 | Laukenmann et al. | |
| 6,681,550 B1 | 1/2004 | Aylward | |
| 6,755,008 B2 | 6/2004 | Schmetzer et al. | |
| 6,789,780 B2 | 9/2004 | Pieri | |
| 6,799,413 B2 | 10/2004 | Aylward | |
| 6,925,782 B2 | 8/2005 | Aylward | |
| 6,929,115 B2 | 8/2005 | Monti | |
| 6,932,210 B2 | 8/2005 | Krämer | |
| 6,971,216 B2 | 12/2005 | Monti | |
| 7,007,821 B2 | 3/2006 | Aylward | |
| 7,012,242 B2 | 3/2006 | Tarozzi et al. | |
| 7,025,207 B2 | 4/2006 | Breu et al. | |
| 7,066,350 B2 | 6/2006 | Aylward | |
| 7,086,522 B2 | 8/2006 | Schmidt | |
| 7,107,741 B2 | 9/2006 | Monti | |
| 7,121,410 B2 | 10/2006 | Rohrmus et al. | |
| 7,124,912 B2 | 10/2006 | Aylward | |
| 7,128,100 B2 | 10/2006 | Monti | |
| 7,331,540 B2 | 2/2008 | Klaumünzner | |
| 7,523,594 B2 * | 4/2009 | Greenwald | B65B 5/103 |
| | | | 221/172 |
| 7,956,623 B2 * | 6/2011 | Bassani | B65B 5/103 |
| | | | 324/663 |
| 8,225,925 B2 * | 7/2012 | Bassani | B65B 5/08 |
| | | | 198/752.1 |
| 9,434,487 B2 * | 9/2016 | Bassani | B65B 43/42 |
| 2001/0045081 A1 | 11/2001 | Aylward | |
| 2002/0023414 A1 | 2/2002 | Aylward | |
| 2002/0088690 A1 * | 7/2002 | Christofferson | B65H 5/021 |
| | | | 198/644 |
| 2002/0108356 A1 | 8/2002 | Aylward | |
| 2002/0125662 A1 | 9/2002 | Magness | |
| 2002/0166790 A1 | 11/2002 | Aylward | |
| 2002/0194815 A1 | 12/2002 | Aylward et al. | |
| 2004/0007442 A1 | 1/2004 | Monti | |
| 2004/0035878 A1 | 2/2004 | Aylward | |
| 2004/0123560 A1 | 7/2004 | Monti | |
| 2004/0123561 A1 | 7/2004 | Monti | |
| 2004/0128955 A1 | 7/2004 | Aylward | |
| 2004/0139695 A1 | 7/2004 | Monti | |
| 2005/0000192 A1 | 1/2005 | Aylward | |
| 2005/0007588 A1 | 1/2005 | Tarozzi et al. | |
| 2005/0077313 A1 | 4/2005 | Aylward | |
| 2005/0126893 A1 | 6/2005 | Berger | |
| 2005/0189373 A1 | 9/2005 | Aylward | |
| 2005/0217208 A1 | 10/2005 | Cicognani | |
| 2005/0230001 A1 | 10/2005 | Monti | |
| 2006/0151252 A1 | 7/2006 | Joos | |
| 2007/0151831 A1 * | 7/2007 | Le Borgne | B65G 41/002 |
| | | | 198/860.1 |
| 2009/0255948 A1 | 10/2009 | Bassani | |

FOREIGN PATENT DOCUMENTS

| | | |
|---|---|---|
| DE | 4118878 A1 | 1/1993 |
| DE | 4331879 A1 | 3/1994 |
| DE | 202004008975 U1 | 8/2004 |
| DE | 102004027590 B3 | 11/2005 |
| EP | 0 259 354 A1 | 7/1987 |
| EP | 0 360 765 A1 | 3/1990 |
| EP | 0 347 392 B1 | 8/1993 |
| EP | 0 486 439 B1 | 3/1994 |
| EP | 0 499 577 B1 | 9/1994 |
| EP | 0 561 737 B1 | 1/1995 |
| EP | 0 588 993 B1 | 1/1995 |
| EP | 0 588 838 B1 | 9/1995 |
| EP | 0 491 658 B1 | 2/1996 |
| EP | 0 639 528 B1 | 11/1996 |
| EP | 0 630 816 B1 | 4/1997 |
| EP | 0 932 554 A1 | 4/1998 |
| EP | 0 618 447 B1 | 5/1998 |
| EP | 0 677 482 B1 | 7/1998 |
| EP | 0 770 554 B1 | 6/1999 |
| EP | 0 816 235 B1 | 4/2000 |
| EP | 1 061 361 A1 | 12/2000 |
| EP | 1 106 511 A1 | 6/2001 |
| EP | 1 251 073 A1 | 10/2002 |
| EP | 1 270 441 A1 | 1/2003 |
| EP | 1 041 022 B1 | 6/2003 |
| EP | 1 171 347 B1 | 1/2004 |
| EP | 1 052 202 B1 | 3/2004 |
| EP | 1 221 410 B1 | 4/2004 |
| EP | 1 060 362 B1 | 5/2004 |
| EP | 1 043 252 B1 | 6/2004 |
| EP | 1 431 180 A1 | 6/2004 |
| EP | 1431181 A1 | 6/2004 |
| EP | 1431182 A2 | 6/2004 |
| EP | 1471993 A1 | 11/2004 |
| EP | 1481913 A1 | 12/2004 |
| EP | 1 253 095 B1 | 9/2005 |
| EP | 1 380 510 B1 | 9/2005 |
| EP | 1588944 A1 | 10/2005 |
| EP | 1602593 A1 | 12/2005 |
| EP | 1 395 500 B1 | 7/2006 |
| EP | 1 391 386 B1 | 8/2006 |
| EP | 1 413 517 B1 | 8/2007 |
| EP | 1 389 583 B1 | 6/2008 |
| GB | 2270771 A | 3/1994 |
| GB | 2310729 A | 9/1997 |
| GB | 2326488 A | 12/1998 |
| JP | 2000079912 A | 3/2000 |
| JP | 2002249103 A | 9/2002 |
| WO | 87/04407 A1 | 7/1987 |
| WO | 92/22278 A1 | 12/1992 |
| WO | 92/22401 A1 | 12/1992 |

(56) References Cited

FOREIGN PATENT DOCUMENTS

| WO | 95/09452 A1 | 4/1995 |
|---|---|---|
| WO | 95-25333 A1 | 9/1995 |
| WO | 96/25333 A1 | 8/1996 |
| WO | 96/26873 A1 | 9/1996 |
| WO | 97/01489 A1 | 1/1997 |
| WO | 97/06061 A1 | 2/1997 |
| WO | 97/19010 A1 | 5/1997 |
| WO | 98/15461 A1 | 4/1998 |
| WO | 98/57144 A1 | 12/1998 |
| WO | 99/45343 A1 | 9/1999 |
| WO | 99/62699 A1 | 9/1999 |
| WO | 00/64744 A1 | 11/2000 |
| WO | 02/100736 A1 | 12/2002 |
| WO | 03/097459 A2 | 11/2003 |
| WO | 2005/023672 A1 | 3/2005 |

OTHER PUBLICATIONS

Written Opinion of the International Searching Authority issued by the Canadian Intellectual Property Office dated Nov. 9, 2007 in connection with International Patent Application Serial No. PCT/CA2007/000238, 8 pages.

Landon IP, Inc., "Patent Search Report", Mar. 17, 2006, 14 pages.

Landon IP, Inc., "Patent Search Report", Apr. 3, 2006, 6 pages.

Non-Final Office Action issued by the United States Patent & Trademark Office dated Nov. 2, 2009 in connection with U.S. Appl. No. 12/094,949, 16 pages.

Final Office Action issued by the United States Patent & Trademark Office dated May 3, 2010 in connection with U.S. Appl. No. 12/094,949, 21 pages.

Non-Final Office Action issued by the United States Patent & Trademark Office dated Sep. 2, 2010 in connection with U.S. Appl. No. 12/094,949, 30 pages.

Non-Final Office Action issued by the United States Patent & Trademark Office dated Nov. 2, 2009 in connection with U.S. Appl. No. 12/102,585, 6 pages.

Non-Final Office Action issued by the United States Patent & Trademark Office dated Jan. 29, 2010 in connection with U.S. Appl. No. 12/102,585, 8 pages.

Final Office Action issued by the United States Patent & Trademark Office dated Jul. 21, 2010 in connection with U.S. Appl. No. 12/102,585, 12 pages.

Non-Final Office Action issued by the United States Patent & Trademark Office dated Feb. 24, 2011 in connection with U.S. Appl. No. 12/102,585, 7 pages.

* cited by examiner

CONTAINER FILLING MACHINE

FIELD OF THE INVENTION

The present invention relates generally to the field of container filling machines for filling containers with discrete articles, and specifically to container filling machines that comprise discrete article dispensing devices for supporting the weight of a load of discrete articles, and adjustable vibration trays for providing different slopes along which discrete articles can travel towards the containers being filled.

BACKGROUND OF THE INVENTION

Container filling machines for filling containers with discrete articles (such as pharmaceutical pills, cosmetic items, hardware components, candies, nuts, etc. . . . ) are known in the art. Such container filling machines are able to take a large supply of discrete articles and transport them towards a container. However, existing container filling machines are plagued with numerous deficiencies that often render them ineffective and inefficient. This is detrimental in a field where the speed Existing container filling machines use large hoppers in order to hold a load of discrete articles that are to fill one or more containers. The hoppers dispense the discrete articles onto a transporting surface of the container filling machine, such that the transporting surface is able to move the discrete articles towards the one or more containers and create space between each discrete article. However, a deficiency with existing hoppers is that they dispense the discrete articles onto the transporting surface in such a way that the weight of the load of discrete articles contained within the hopper is transferred directly to the transporting surface. This may cause undue wear on the container filling machine, and may also hinder the exit of the discrete articles from the hopper onto the transporting surface.

Furthermore, existing container filling machines typically use vibration trays in order to create space between the discrete articles and move the discrete articles forward towards the containers to be filled. However, the speed at which such vibration trays are able to move the discrete articles forward is generally quite limited. In addition, the speed at which the vibration trays are able to move different types of discrete articles varies depending on the discrete article being handled. For example, while the vibration trays may be able to move small circular discrete articles forward fairly quickly, the same vibration tray may not be able to move a different type of discrete article, such as a larger oval-shaped discrete article, as quickly. As such, traditional vibration trays are not particularly versatile when it comes to handling multiple different types of discrete articles.

In light of the above, it is clear that there is a need in the industry for an improved container filling machine that alleviates, at least in part, the deficiencies of existing container filling machines, and provides more versatility in being able to process discrete articles of different shapes and sizes.

SUMMARY OF THE INVENTION

In accordance with a first broad aspect, the present invention comprises a vibration tray assembly for use in a container filling machine, the vibration tray assembly comprising a tray for transporting discrete articles from a receiving end of the tray towards a drop-off end of the tray, the tray providing a slope along which the discrete articles travel from the receiving end of the tray to the drop-off end of the tray, wherein the tray is adjustable for changing the slope along which the discrete articles travel. The vibration tray assembly further comprises a vibration imparting device for imparting vibrational motion to the tray.

In accordance with a second broad aspect, the present invention comprises a container filling machine for filling a plurality of containers with discrete articles. The container filling machine comprises a vibration tray assembly, a discrete article dispensing device for providing discrete articles to the receiving end of the tray and a plurality of pathways for receiving the discrete articles from the drop-off end of the tray, the plurality of pathways leading to at least one container to be filled with the discrete articles. The vibration tray assembly comprises a tray for transporting discrete articles from a receiving end of the tray towards a drop-off end of the tray, the tray providing a slope along which the discrete articles travel from the receiving end of the tray to the drop-off end of the tray, wherein the tray is adjustable for changing the slope along which the discrete articles travel. The vibration tray assembly further comprises a vibration imparting device for imparting vibrational motion to the tray.

In accordance with a third broad aspect, the present invention comprises a method for filling at least one container with discrete articles, wherein the discrete articles are transported towards the at least one container via a vibration tray. The method comprising determining a characteristic associated with at least one discrete article from a load of discrete articles intended to fill the at least one container, determining, at least in part on a basis of the characteristic, a position for the vibration tray, such that the vibration tray acquires a given slope along which the discrete articles travel from a receiving end of the vibration tray to a drop-off end of the vibration tray, the given slope being one of at least two possible slopes and causing the vibration tray to acquire the given slope.

In accordance with a fourth broad aspect, the present invention comprises a discrete article dispensing device comprising a receptacle for holding a load of discrete articles and a dispensing outlet through which discrete articles from the load of discrete articles exit the receptacle onto a discrete article transporting surface, the dispensing outlet defining a slot between a first wall portion of the discrete article dispensing device and a second wall portion of the discrete article dispensing device and a ramp portion that extends past the slot for depositing discrete articles from the load of discrete articles onto a discrete article transporting surface.

In accordance with a fifth broad aspect, the present invention comprises a container filling machine for filling a plurality of containers with discrete articles. The container filling machine comprises a discrete article dispensing device comprising a receptacle for holding a load of discrete articles for filling the plurality of containers and a dispensing outlet through which discrete articles from the load of discrete articles exit the receptacle, the dispensing outlet defining a slot between a first wall portion of the discrete article dispensing device and a second wall portion of the discrete article dispensing device, and a ramp portion that extends past the slot for guiding the discrete articles out of the discrete article dispensing device. The container filling machine further comprising a discrete article transporting surface for receiving the discrete articles from the discrete article dispensing device and for guiding the discrete articles towards the plurality of containers.

In accordance with a sixth broad aspect, the present invention comprises a method comprising receiving, at a processing entity, a characteristic associated with at least one discrete article from a load of discrete articles, the load of discrete articles being held in a discrete article dispensing device. The discrete article dispensing device comprising a receptacle for holding the load of discrete articles, a dispensing outlet through which the discrete articles from the load of discrete articles exit the receptacle onto a discrete article transporting surface, the dispensing outlet defining a slot between a first wall portion of the discrete article dispensing device and a second wall portion of the discrete article dispensing device, wherein the first wall portion comprises a ramp that extends past the slot towards the discrete article transporting surface, the ramp having a drop-off end from which the discrete articles are deposited onto the discrete article transporting surface. The method further comprising determining, at the processing entity, at least in part on a basis of the characteristic associated with the at least one discrete article, a suitable distance between the drop-off end of the ramp and the discrete article transporting surface and causing the discrete article dispensing device to move in relation to the discrete article transporting surface for acquiring the suitable distance between the drop-off end of the ramp and the discrete article transporting surface.

In accordance with a seventh broad aspect, the present invention comprises a container filling machine for filling a plurality of containers with discrete articles. The container filling machine comprises a plurality of guiding paths between a discrete article dispensing device and at least one container to be filled. The container filling machine further comprises a path blocking device located along each of the plurality of guiding paths at a position prior to the at least one container to be filled. Each path blocking device is operative for acquiring a first position in which the path blocking device blocks a passage of discrete articles along a guiding path and a second position in which the path blocking device allows the passage of discrete articles along the guiding path. The movement of the path blocking device between the first position and the second position is controlled via a solenoid device.

Other aspects and features of the present invention will become apparent to those ordinarily skilled in the art upon review of the following description of specific embodiments of the invention in conjunction with the accompanying figures.

DETAILED DESCRIPTION

Figure 1:
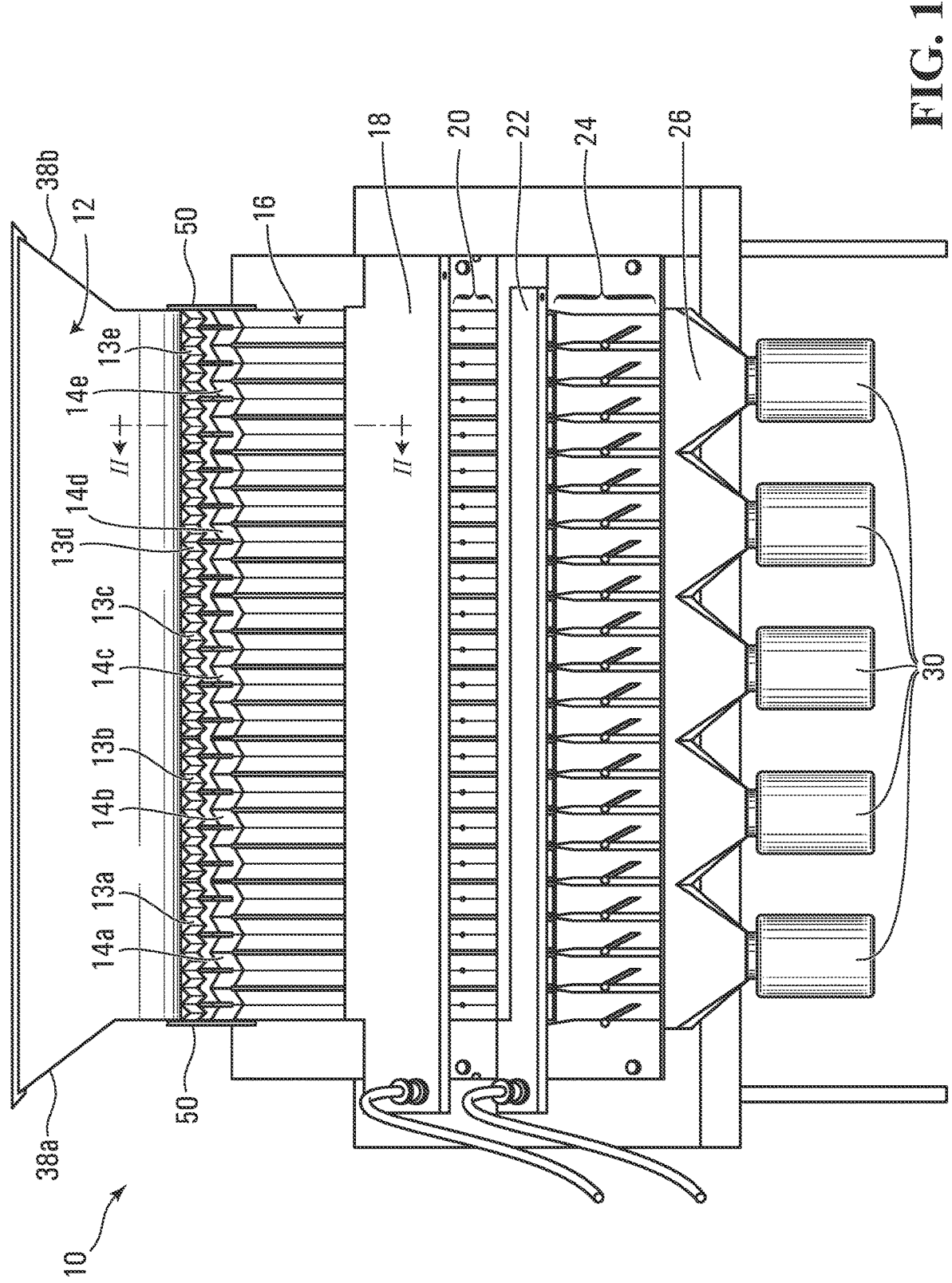
FIG. 1 shows a front plan view of a container filling machine in accordance with a non-limiting example of implementation of the present invention.

Shown in FIG. 1 is a front view of a container-filling machine 10 in accordance with a non-limiting example of implementation of the present invention. The container filling machine 10 is suitable for loading into containers discrete articles, such as discrete articles for personal treatment (e.g. pharmaceutical pills, cosmetic items, etc) or candies, nuts, or any other type of discrete article. As used herein, the term "discrete article for personal treatment" includes any type of pharmaceutical discrete article that may be ingested (such as pressed-powder or gel cap pills, among other possibilities) as well as any cosmetic item that may be applied to an external part of the body (such as moisturizer capsules, for example).

In the non-limiting embodiment shown, the container filling machine 10 includes a discrete article dispensing device 12, guiding trays 13a-13e, vibration trays 14a-14e, a plurality of guiding paths 16, a sensing device 18, a rejection device 20, a counting device 22, a plurality of path blocking devices 24, and a set of funnels 26 for guiding the discrete articles into respective containers 30.

In use, the discrete articles travel through the container filling machine in order to be placed into one of the containers 30. Initially, a load of discrete articles is placed within the discrete article dispensing device 12, which then deposits the discrete articles onto the guiding trays 13a-13e. The guiding trays 13a-13e move the discrete articles forward via vibrational motion, and also cause the discrete articles to become spaced from one another as they travel towards the vibration trays 14a-14e. Once the discrete articles reach the vibration trays 14a-14e, the vibration trays 14a-14e continue to carry the discrete articles towards the guiding paths 16 and create further spacing between the discrete articles. The discrete articles then slide down the guiding paths 16 through the sensing device 18, which senses whether or not the discrete articles are defective. The discrete articles then pass the rejection device 20, which removes defective ones of the discrete articles from continued travel along the guiding paths 16. If not removed by the rejection device 20, the discrete articles continue to pass through the counting device 22. The counting device 22 counts the discrete articles before they enter the funnels 26 which funnel the discrete articles into one of the containers 30. The sensing device 18, rejection device 20, counting device 22 and plurality of path blocking devices 24 are described in more detail in issued U.S. Pat. No. 7,956,623, belonging to the same applicant, and as such will not be described in more detail herein.

Figure 2A:
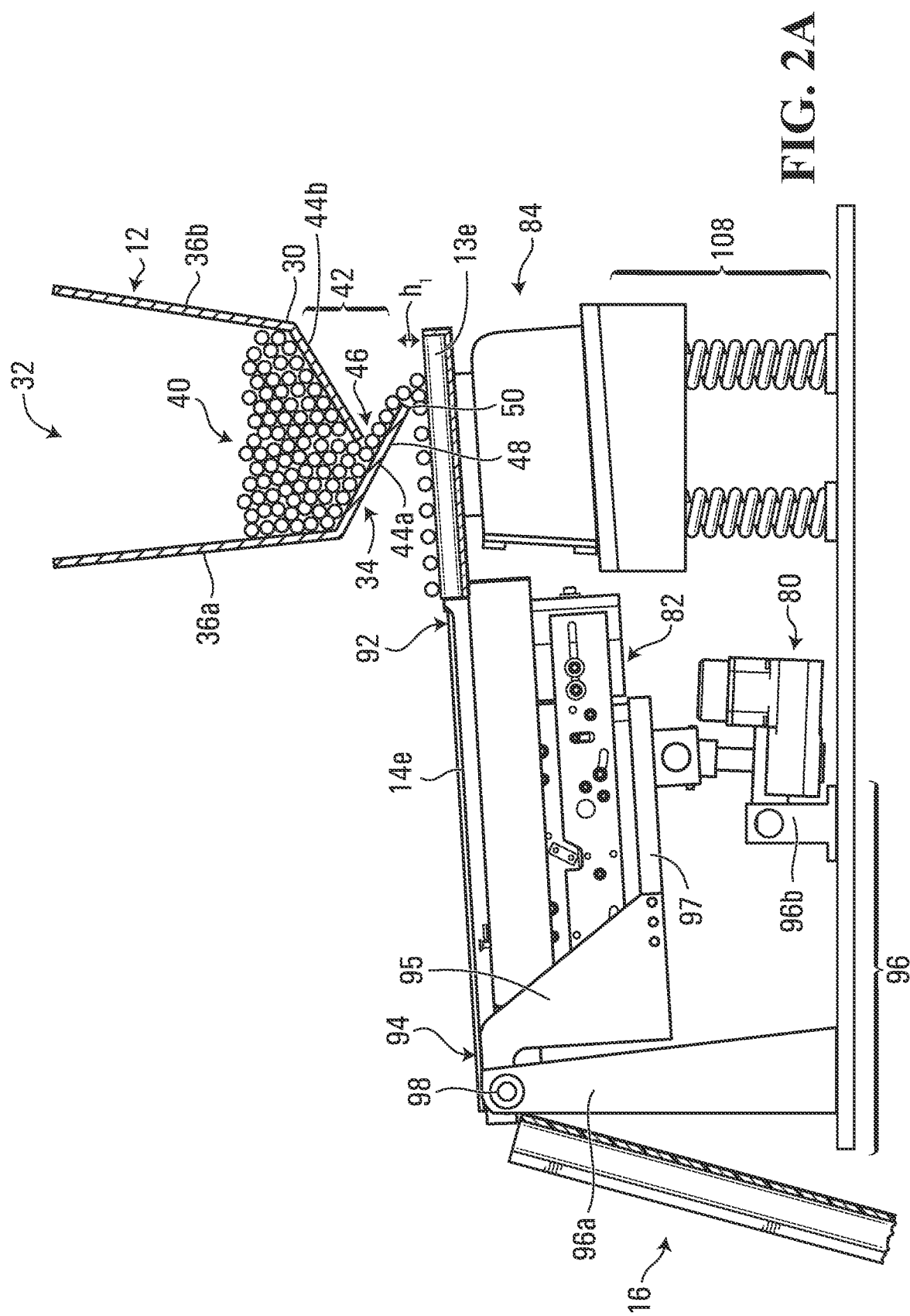
FIG. 2A shows a side plan view of the upper portion of the container filling machine of FIG. 1 in a first position.
Figure 2B:
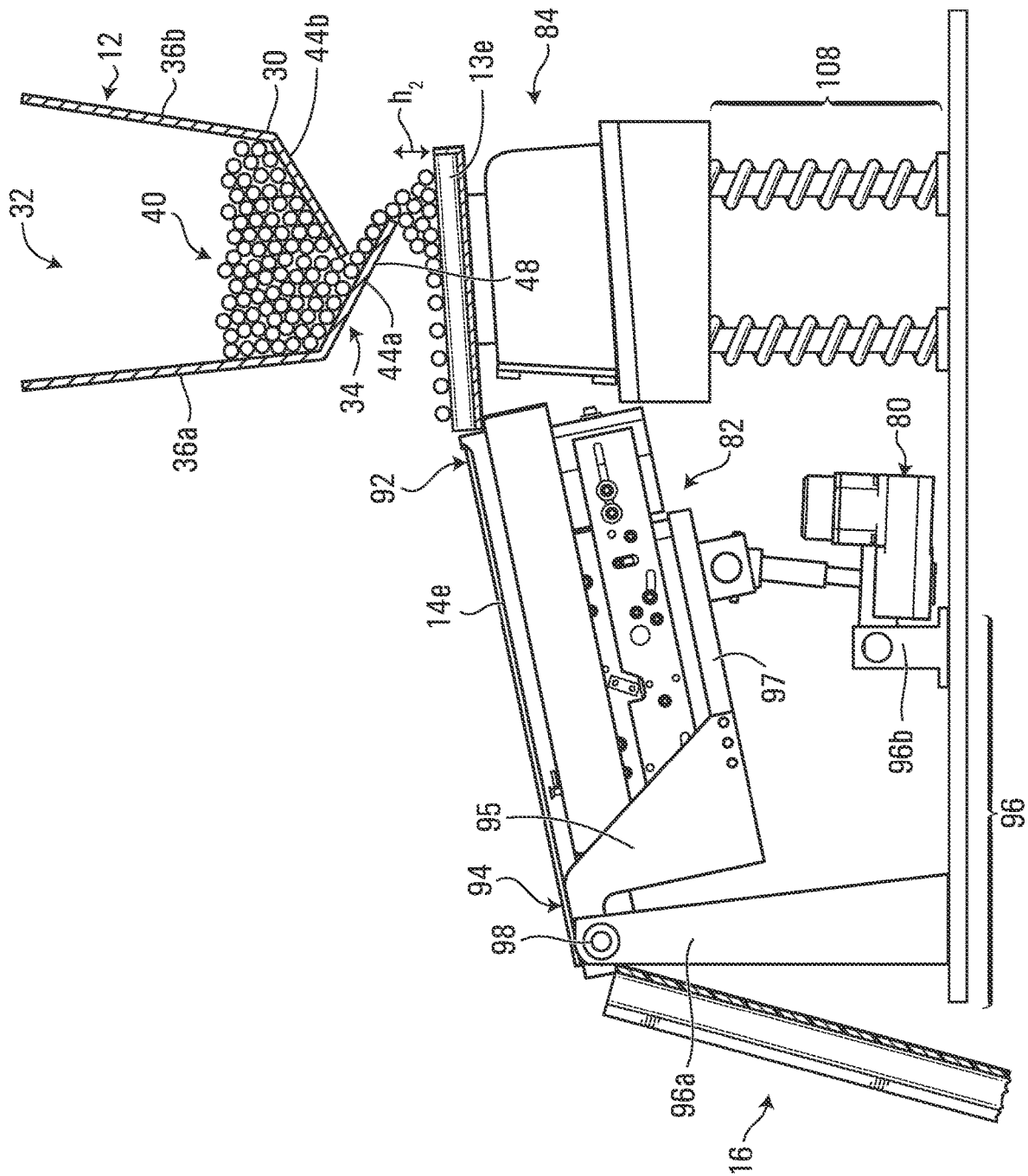
FIG. 2B shows a side plan view of the upper portion of the container filling machine of FIG. 1 in a second position.

Shown in FIGS. 2A and 2B are cross-sectional side views of an upper portion of the container filling machine 10. These figures show side views of the discrete article dispensing device 12 and the vibration tray 14*e* in two different positions, which will be described in more detail further on in the description.

The Discrete Article Dispensing Device 12

The discrete article dispensing device 12 comprises a receptacle 30 for holding a load of discrete articles 40 that are to fill the containers 30. The load of discrete articles 40 is generally placed into the receptacle 30 through an opening 32 in the discrete article dispensing device 12. The discrete articles do not need to be provided to the discrete article dispensing device 12 in any particular order or orientation, and as such may be quickly poured into the hopper 12. In use, the opening 32 may be left open to the environment, or may be covered by a lid or other form of cover (not shown). The lid may be permanently attached to the receptacle, such that it may be opened and closed via a hinge-type mechanism, or alternatively, the lid may be a separate component from the receptacle 30 that may be removably secured over the opening 32 to the receptacle 30 via a friction fit or snap-fit arrangement, among other possibilities.

The load of discrete articles 40 may be placed inside the receptacle 30 in any suitable manner, such as by dumping or pouring the load of discrete articles 40 through the opening 32 into the receptacle 30. The load of discrete articles 40 may be placed into the receptacle 30 either manually by a worker operating the container filling machine 10, or by another machine or robot that is capable of continually or repetitively filing the receptacle 30 with discrete articles.

The receptacle 30 according to the present invention may be of any size and shape. In the non-limiting example shown in FIGS. 1, 2A and 2B, the receptacle 30 is in the shape of a rectangular trough with two side walls 36*a*, 36*h*, two end walls 38*a*, 38*b* (shown in FIG. 1) and a base portion 34 that comprises a dispensing outlet 42 through which the discrete articles exit the receptacle 30. It should, however, be understood that the receptacle 30 may be of any other shape and size, such as cylindrical or cone-shaped, no long as it is able to hold the load of discrete articles 40. In accordance with a non-limiting example, the receptacle 30 has a shape and size suitable for accommodating a load of discrete articles having a weight of between 10 kg to 30 kg and a volume of between 15 L to 75 L. In a specific, non-limiting example, the receptacle 30 has a volume of approximately 60 L and is able to support at least a weight of 21 kg worth of discrete articles. The receptacle 30 may be made of any suitable material known in the art, such as plastic, ceramic and/or stainless steel, among other possibilities.

In the non-limiting embodiment shown, the base portion 34 of the receptacle 30 comprises a first bottom wall 44*a*, a second bottom wall 44*b* and a dispensing outlet 42. The dispensing outlet 42 comprises a slot 46 that is formed between the first wall portion 44*a* and the second wall portion 44*b*, for allowing discrete articles to exit the receptacle 30, and a ramp portion 48 for receiving the discrete articles from the slot 46 and transporting them onto the guiding trays 13*a*-13*d*. The slot 46 may extend the entire length of the base portion 34, or may extend only along a portion of the length of the base portion 34, such as along 60% or 70% of the length, for example.

In addition, and although not shown in the Figures, the slot 46 may have a gate portion or other slot narrowing device, such that the output through which the discrete articles exit the discrete article dispensing device 12 onto the guiding trays 13*a*-13*e* may be adjusted in size. For example, the adjustable gate portion may adjust the size of the output to make it smaller or larger in order to facilitate the depositing of discrete articles of different sizes onto the guiding trays 13*a*-13*e*.

In the non-limiting embodiment shown in FIG. 1, the container filling machine 12 comprises five guiding trays 13*a*-13*e* and five respective vibration imparting devices 84 for imparting vibrational motion to the guiding trays 13*a*-13*e*. Each of the guiding trays 13*a*-13*e* is in communication with its own vibration imparting device 84 such that the vibrational motion of each guiding tray 13*a*-13*e* may be controlled independently. These vibration imparting devices 84 may comprise either electromagnetic drive units, pneumatic drive units or mechanical drive units, among other possibilities, that are attached to spring systems (not shown), and/or resilient plates (not shown) for transmitting vibrational motion to the guiding trays 13*a*-13*e*. Although five guiding trays 13*a*-13*e* are shown, it should be understood that any number of guiding trays could be used in order to form the initial discrete article transporting surface that receives the discrete articles from the discrete article dispensing device 12.

As mentioned above, the dispensing outlet 42 further comprises a ramp portion 48 that extends past the slot 46 for receiving the discrete articles that exit through the slot 46 and directing them downwards towards the guiding paths 13*a*-13*e*. In the embodiment shown in FIGS. 2A and 2B, the ramp portion 48 is formed by the first bottom wall 44*a* and extends from the slot 46 towards the guiding paths 13*a*-13*e*. In addition, the ramp portion 48 of the first bottom wall 44*a* underlaps the second bottom wall 44*b*, such that the ramp portion 48 is positioned underneath the second bottom wall 44*b*.

The ramp portion 48 may have any suitable slope for enabling discrete articles from the load of discrete articles 40 to slide down and be deposited onto the guiding trays 13*a*-13*e*. For example, the ramp portion 48 may have a slope of between 10-20 degrees, when measured from a horizontal plane. In a non-limiting example of implementation, the ramp portion 48 for discharging the discrete articles has a slope of approximately 15 degrees when measured from a horizontal plane. It should be appreciated that these angles are given for the purpose of example, and should not be used to limit the present invention.

The base portion 34 of the receptacle 30 may have a variety of different configurations. In the embodiment shown in FIGS. 2A and 2B, the first bottom wall 44*a* and the second bottom wall 44*b* of the base portion 34 define sloped surfaces that extend respectively from the two side walls 36*a*, 36*b* towards each other, such that the slot 46 is located in proximity to the center of the width of the receptacle 30 and the ramp portion 48 formed by the first bottom wall 44*a* extends underneath the second bottom wall 44*b*. However, other configurations for the base portion 34 of the receptacle 30 are also possible without departing from the scope of the present invention.

Figure 3C:
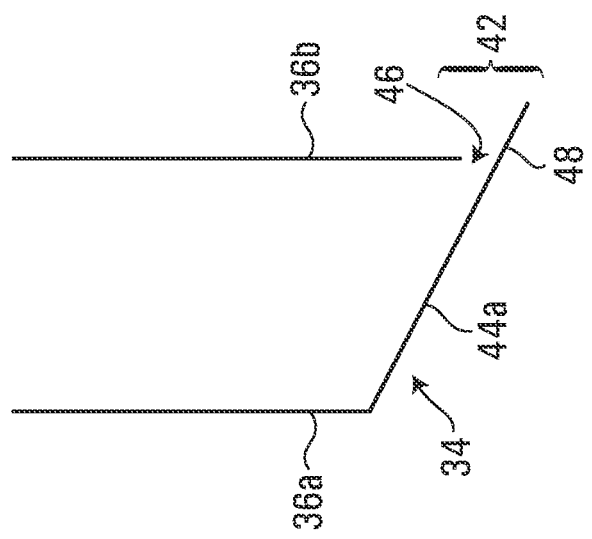
FIGS. 3A-3C show alternative non-limiting examples of receptacles 30 for the container filling machines 10 of FIG. 1.
Figure 3B:
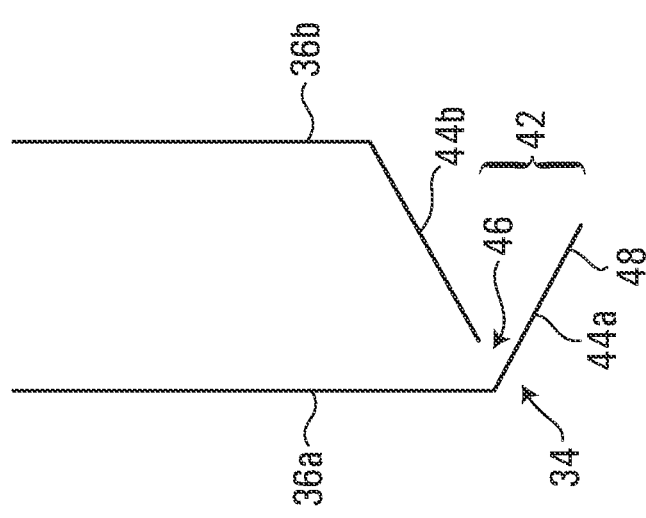
Figure 3A:
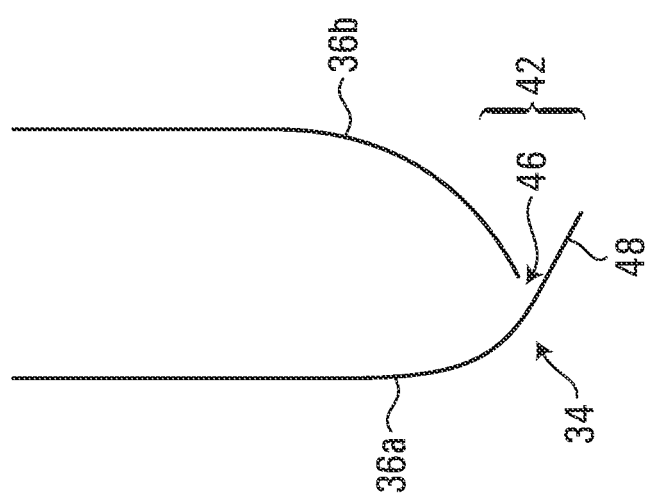

Shown in FIGS. 3A-3B are three alternative configurations for the base portion 34 of the receptacle 30. Each configuration comprises a dispensing outlet 42 in accordance with the present invention. Like reference numerals have been used to represent like parts. FIG. 3A shows a first alternative embodiment of a base portion 34, wherein the bottom walls are integrally formed with the side walls 36*a*, 36*b* of the receptacle 30. As such, the base portion 34 of the receptacle 30 is formed by the two side walls 36*a*, 36*b*. The side wall 36*a* forms the ramp portion 48 that extends past the slot 46 and underlaps the side wall 36*b* for receiving the discrete articles from the slot 46 and directing them towards the guiding trays 13a-13e. In the second alternative embodiment shown in FIG. 3B, the second bottom wall 44b forms a sloped surface that extends from the side wall 36b almost all the way to the interior of the opposing side wall 36a, such that the slot 46 that is defined between the first bottom wall 44a and the second bottom wall 44b is located towards one side of the receptacle 30. The first bottom wall 44a underlaps the second bottom wall 44b such that a majority of the first bottom wall 44a forms the ramp portion 48 that extends past the slot 46 towards the guiding paths 13e. In the third alternative embodiment shown in FIG. 3C, the base portion 34 does not comprise a second bottom wall, and instead comprises only a first bottom wall 44a. In this embodiment, the first bottom wall 44a forms a sloped surface that extends downwards from the side wall 36a in the direction of the side wall 36b. The slot 46 is thus formed beneath the side wall 36b and the first bottom wall 44a. The first bottom wall 44a then continues past the slot 46 for forming the ramp portion 48 that receives the discrete articles from the slot and guides them downwardly towards the guiding paths 13a-13. Although in the embodiments described above it is the first bottom wall 44a (or the side wall 36a) that forms the ramp portion 48 that extends past the slot 46, it should be understood that in alternative embodiments, it is the second bottom wall 44b that forms the ramp portion 48 for receiving the discrete articles from the slot 46.

In existing discrete article dispensing devices, the slot through which the discrete articles exit the device opens directly onto the discrete article transporting surface. As a result, as the discrete articles exit the slots onto the transporting surface, they have the entire weight of the load of discrete articles sitting on top of them. This weight is in turn transferred to the discrete article transporting surface onto which they are being dispensed.

In accordance with the present invention, the base portion 34 of the receptacle is designed so as to support the bulk of the weight of the load of discrete articles 40 as discrete articles exit through the slot 46. In this manner, the weight of the load of discrete articles 40 is not transferred to the discrete article transporting surface, which in the embodiment shown in the Figures, comprises the guiding trays 13a-13e. As described above, in accordance with the present invention, the dispensing outlet 42 comprises both a slot 46 through which the discrete articles exit, and a ramp portion 48 that extends from the slot for receiving the discrete articles from the load of discrete articles 40 as they travel pass through the slot 46. Given that the discrete articles do not fall directly from the slot 46 onto the guiding trays 13a-13e, the weight of the load of discrete articles 40 is not transferred to the guiding trays 13a-13e. Instead, at least part of the base portion 34 of the receptacle 30 supports the bulk of the weight of the load of discrete articles 40. More specifically, at least one of the first wall bottom wall 44a and the second bottom wall 44b supports the weight of the load of discrete articles 40.

In the embodiment shown in FIGS. 2A and 2B, the weight of the load of discrete articles 40 is supported by the first bottom wall 44a and the second bottom wall 44b. As discrete articles from the load of discrete articles 40 exit the slot 46, the ramp portion 48 supports the weight of the discrete articles that have exited the slot 46, such that the guiding trays 13a-13e (that make up the discrete article transporting surface), only support the weight of the discrete articles that are positioned on the guiding trays 13a-13e. However, in alternative embodiments, such as those shown in FIGS. 3b and 3c, the weight of the load of discrete articles 40 is supported differently. For example, in the case of the receptacle 30 shown in FIG. 3b, it is the second bottom wall 44b, that will support the majority of the weight of the load of discrete articles 40, and in the case of the receptacle 30 shown in FIG. 3c, it is the first bottom wall 44a that supports the majority of the weight of the load of discrete articles 40.

Although not shown in the Figures, the discrete article dispensing device 12 may be mounted to, or in relation to, the container filling machine 10 in a variety of different manners. Referring back to FIG. 1, the discrete article dispensing device 12 may be mounted to a frame of the container filling machine 10 via connector elements 50 that connect the side walls 38a, 38b of the discrete article dispensing device 12 to the frame for supporting the receptacle 30 over the guiding trays 13a-13e. Alternatively, the connector elements 50 may be connected to the discrete article dispensing device 12 at other positions along the outer surface of the device 12. The connector elements 50 may be plates or rods that connect the discrete article dispensing device 12 to the frame of the container filling machine 10 in a fixed position, or the connector elements 50 may be adjustable components that enable the position of the discrete article dispensing device 12 to be adjusted in relation to the frame of the container filling machine 10, and more specifically, in relation to the receiving surface of the guiding trays 13a-13e (or other form of discrete article transporting surface).

For example, the adjustable connector elements 50 may be hydraulic or pneumatic pistons that are able to expand and retract for increasing or decreasing the height of the discrete article dispensing device 12 in relation to the receiving surface of the guiding trays 13a-13e. The adjustable connector elements 50 could also be mechanical connector elements 50, such as a ratcheted connector or a rack and pinion gear arrangement, among other possibilities, that is capable of mechanically adjusting the height of the discrete article dispensing device 12 in relation to the receiving surface of the guiding trays 13a-13e. The adjustment of the height of the discrete article dispensing device 12 may be done manually, or alternatively may be automated such that a drive mechanism in communication with the connector elements 50 causes the height to be adjusted. When automated, this adjustment may be performed on a basis of user input information or an input received from a sensor, which will be described in more detail below.

As shown in FIGS. 2A and 2B, in use, the discrete articles are deposited from the ramp portion 48 of the discrete article dispensing device 12 onto a back end of the guiding trays 13a-13e. Due to the vibrational motion applied to the guiding trays 13a-13e, the discrete articles are caused to move towards the front of the guiding trays 13a-13e such that they are able to move onto vibration trays 14a-14e. However, in the embodiments shown, in order to move from the back of the guiding trays 13a-13e towards the front of the guiding trays 13a-13e, the discrete article must pass by the drop-off edge 50 of the ramp portion 48. The drop-off edge 50 of the ramp portion 48 thus acts as a type of gate under which the discrete articles may pass. The height between the receiving surface of the guiding trays 13a-13e and the drop-off edge 50 of the ramp portion 48 therefore acts to limit the amount of discrete articles that may move past the drop-off edge 50 of the discrete article dispensing device 12.

In FIG. 2A, the drop-off edge 50 of the discrete article dispensing device 12 is positioned at a height "$h_1$" above the receiving surface of the guiding trays 13a-13e. At height "$h_1$" only a single layer of discrete articles is able to pass beneath the drop-off edge 50 of the discrete article dispensing device 12 at the same time. This helps to prevent too many discrete articles from arriving at the vibration trays 14a-14e at the same time. In FIG. 2B, the drop-off edge 50 is positioned at a height of "$h_2$" above the receiving surface of the guiding trays 13a-13e. At height "$h_2$", at least two stacked layers of discrete articles are able to pass by the drop-off edge 50 of the discrete article dispensing device 12. In this manner, the discrete article dispensing device 12 allows a greater amount of discrete articles to move towards the vibration trays 14a-14e at the same time.

In the case where the container filling machine 10 is intended to be used to process discrete articles of different sizes and shapes, it makes sense for the positioning of the discrete article dispensing device 12 to be adjustable in relation to the receiving surface of the guiding trays 13a-13e. As mentioned above, the adjustment of the height of the discrete article dispensing device 12 in relation to the receiving surface of the guiding trays 13a-13e may be done manually or may be automated via a dispensing device drive mechanism that causes the height to be adjusted. The dispensing device drive mechanisms generally comprises an electrical motor in communication with mechanical components, such as a gear assembly or a piston assembly, for causing the height of discrete article dispensing device 12 to be adjustable.

Figure 4:
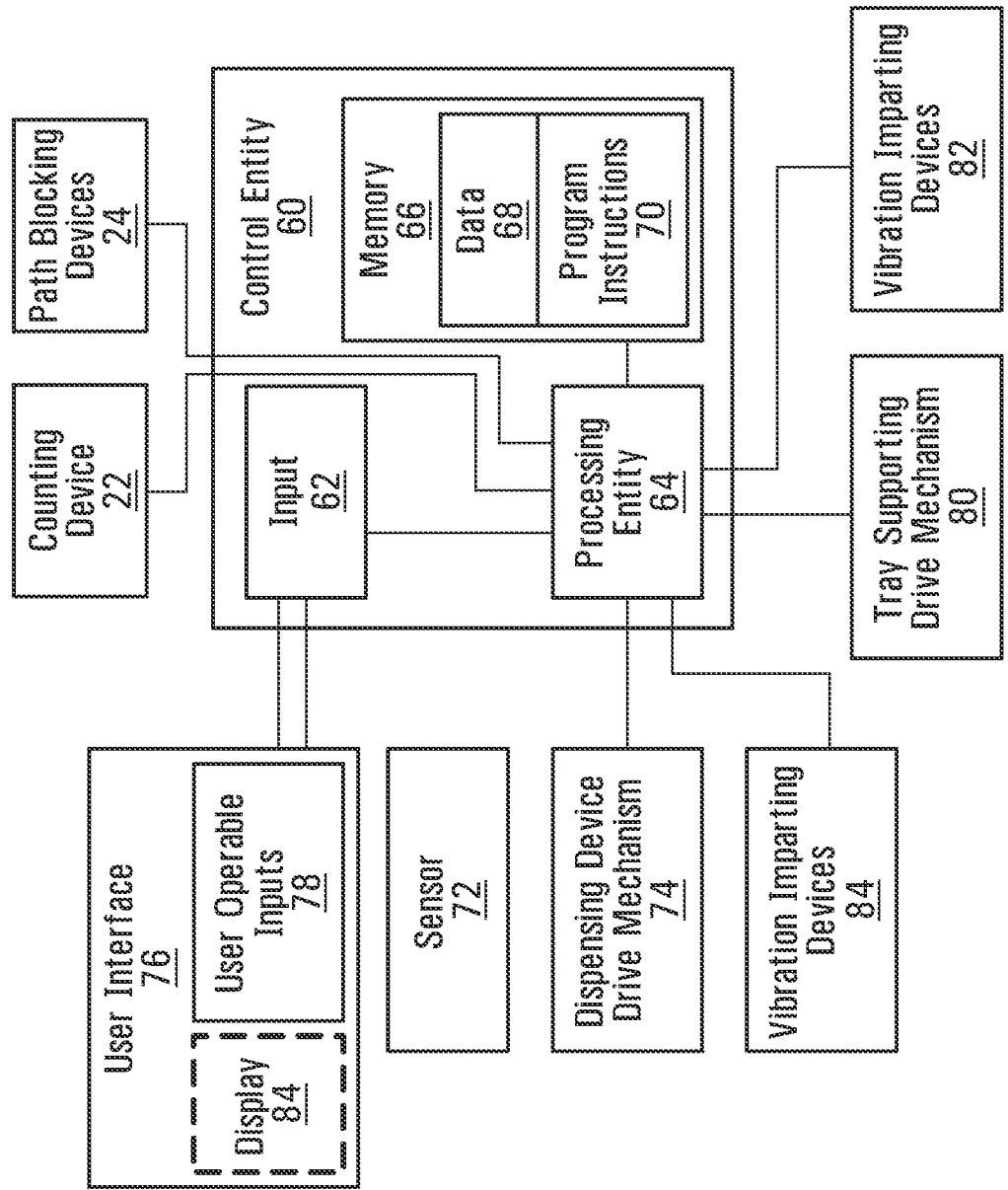
FIG. 4 shows a non-limiting block diagram of a control entity suitable for implementing at least some of the functionality of the container filling machine according to a non-limiting example of implementation of the present invention.
Figure 5:
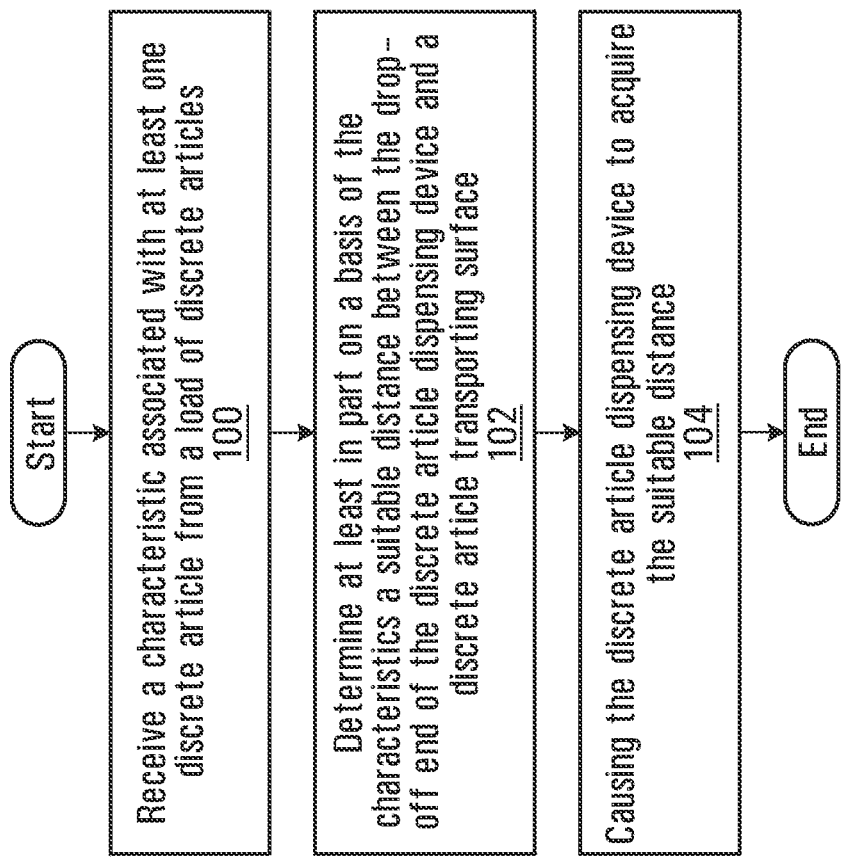
FIG. 5 shows a flow diagram of a non-limiting method of causing the discrete article dispensing device to acquire a given position in relation to a discrete article transporting surface.

The manner in which the height of the discrete article dispensing device 12 may be adjusted will now be described in more detail with respect to the block diagram of FIG. 4 and the flow diagram of FIG. 5. As shown in FIG. 4, a control entity 60 is in communication with the dispensing device drive mechanism 74 that is operative for causing the position of the discrete article dispensing device 12 to be adjusted. As described above, the dispensing device drive mechanism 74 generally comprises an electrical motor in order to impart motion to mechanical components that cause the receptacle 30 of the discrete article dispensing device 12 to move up and down.

In accordance with the non-limiting embodiment shown, the control entity 60 comprises an input 62 for receiving commands and/or information from a user interface 76 and/or a sensor 72 (optional). The control entity 60 further comprises a processing entity 64 in communication with a memory 66. The memory comprises data 68 and program instruction 70 for being accessed and executed by the processing entity 64 for implementing the functionality that will be described in more detail below.

The control entity 60 may be a dedicated control entity for controlling the movement of the discrete article dispensing device 12, or alternatively, the control entity 60 may be in communication with other components, such as a tray supporting drive mechanism 80 and a vibration imparting device 82, which will be described in more detail below, for controlling the functionality of these components as well. The control entity 60 may be an integral part of the container filling machine 10, or may be a portable device such as a laptop, or desktop computer that is connected via cables to the components 74, 80 and 82. In yet a further alternative embodiment, the control entity 60 may be implemented within a portable wireless device, such as a smart phone, such that it is in communication with the various components over wireless RE or cellular connections. In yet a further example of implementation, the control entity 60 may be implemented at a remote server, such that it is in communication with the components 72, 74, 76, 80 and 82 over network connections, via the internet, or a local intranet, for example.

In accordance with a first non-limiting example of implementation, the control entity 60 is operative for controlling the movement of the dispensing device drive mechanism 74 at least in part on a basis of information entered by a user via the user interface 76. In accordance with a second non-limiting example of implementation, the control entity 60 is operative for controlling the movement of the dispensing device drive mechanism 74 at least in part on a basis of information received from a sensor 72. Each of these different scenarios will be described in more detail below.

i) Controlling Movement of the Dispensing Device Drive Mechanism 74 on a Basis of Information Entered by a User.

As mentioned above, the user interface 76 comprises user operable inputs 78 for enabling a user to provide information, such as commands, to the control entity 60. The user operable inputs 78 may be buttons, levers, toggles or any other sort of mechanical input operable by a user and known in the art. The user interface 76 may also be a graphical user interface that comprises a display screen 84. In the case of a graphical user interface, the user operable inputs 78 may include user input elements displayed on the display screen that operable by "clicking" on the user input elements via an input device such as a mouse, a stylus pen, a touch sensitive screen or a ball mechanism.

The control entity 60 may receive information from a user via the user interface 76 indicative of one or more command signals for causing the control entity 60 to cause an adjustment in the position of the discrete article dispensing device 12. For example, a user may operate one or more of the user operable inputs 78 in order to provide a command signal to the control entity 60, indicative that the discrete article dispensing device 12 should be moved "up" or "down". This may be done by pushing an up/down lever into an "up" position, for providing a signal indicative that the discrete article dispensing device should move upwards so as to increase the height between the discrete article dispensing device 12 and the receiving surface of the guiding trays 13a-13e. So long as the user is activating the user operable input to provide an "up" command signal, or until a user provides a "stop" command signal, the processing entity 64 will issue control signals to the dispensing device drive mechanism 74, for causing the discrete article dispensing device 12 to move upwards. Similarly, a user may operate one or more of the user operable inputs 78 in order to provide a signal to the control entity 60 indicative that the discrete article dispensing device should move downwards. So long as the user is activating a "down" user operable input, or until a user stops the downwards movement by providing a "stop" input, the processing entity 64 will issue control signals to the dispensing device drive mechanism 74, for causing the discrete article dispensing device 12 to move downwards, thereby decreasing the height between the discrete article dispensing device 12 and the receiving surface of the guiding trays 13a-13e.

In the above manner, a user may interact with the user interface 76 in order to position the discrete article dispensing device 12 at a desired height in relation to the receiving surface of the guiding trays 13a-13e. A desirable height at which the discrete article dispensing device 12 may be positioned above the receiving surface of the guiding trays 13a-13e would be known by a person of skill in the art, and may be based, at least in part, upon criteria such as the size and shape of the discrete articles being handled, the frequency of vibration of the guiding trays and the rate at which the discrete article dispensing device 12 supplies discrete articles from the load of discrete articles 40 to the guiding trays 13a-13e.

Alternatively, the control entity 60 may receive information from a user via the user interface 76 indicative of a characteristic associated with at least one discrete article from the load of discrete articles 40 being handled, and cause the position of the discrete article dispensing device 12 to be adjusted on a basis of this received information. The manner in which this is done will be described in more detail with reference to the flow chart of FIG. 5.

At step 100, the control entity 60 receives from a user, information indicative of a characteristic of at least one discrete article from the load of discrete articles 40 being handled. The characteristic may be indicative of an identifier of the discrete articles, such as the name of the discrete article, a serial number associated with the discrete article or, in the case where the discrete articles are pharmaceutical pills, the generic chemical compound of the pills. The characteristic could also be the weight of an individual discrete article, the volume of an individual discrete article, the diameter of an individual discrete article or any other physical characteristic of a discrete article. The characteristic could also be associated with the entire load of discrete articles 40 being handled, such as the weight of the load of discrete articles 40, the volume of the load of discrete articles 40 or a batch number of the load of discrete articles. This information indicative of the characteristic is received at the input 62 from the user interface 76, and is then passed to the processing entity 64.

At step 102, the processing entity 64 may then determine, at least in part on a basis of the information indicative of a characteristic of at least one discrete article, a suitable height between the drop-off end 50 of the discrete article dispensing device 12 and the receiving surface of the guiding trays 13a-13e, at which to position the discrete article dispensing device 12. This determination may be done in a variety of manners. For example, the determination may be done on a basis of a look-up function using a database that is stored in the data 68 of the memory 66. The database may comprise a list of characteristics that could be provided by a user, and associated with each characteristic is a corresponding height for the discrete article dispensing device 12. For example, in the case where the information indicative of a characteristic of at least one discrete article is a name or other identifier of the discrete articles, the processing entity 64 may access the database and look for an entry that matches the characteristic identified by the user. Once the processing entity 64 has found the entry in the database that matches the information indicative of a characteristic input by the user, the processing entity 64 would then determine the corresponding height for the discrete article dispensing device 12 that is contained in the entry for the matching characteristic.

The database may be provided by a manufacturer of the container filling machine 10, or may be slowly established by a user of the container filling machine. For example, each time a user has manually and possibly through trial-and-error established a suitable position for the discrete article dispensing device 12 when handling a given type of discrete article, the user may save a record within the memory 66 in order to store in connection with one or more characteristics of the discrete article (such as its weight, shape, volume, name and/or serial number) an associated position wherein the drop-off end 50 of the discrete article dispensing device 12 is at a suitable height from the receiving surface of the guiding trays 13a-13e.

Alternatively, the determination of a suitable height may be done by executing a pre-established algorithm. The pre-established algorithm may be stored within the program instructions 70 of the memory 66. For example, in the case where the information indicative of a characteristic of at least one discrete article is a weight or volume of a discrete article, the processing entity 64 may access the pre-established algorithm stored in the memory, for applying the entered weight or volume into the pre-established algorithm. By running the algorithm at least in part on a basis of the entered characteristic (such as weight or volume), the output of the algorithm will provide a suitable position for the discrete article dispensing device 12. In order to obtain the output of the algorithm, other values may need to be input into the algorithm, such as the frequency of vibration of the guiding trays 13a-13e and the size of the slot 46, among other possibilities.

Once a suitable position for the discrete article dispensing device 12 has been determined, at step 104, the processing entity 64 is operative for causing the discrete article dispensing device to acquire the suitable position. This may be done by issuing one or more control signals to the dispensing device drive mechanism 74, for instructing the discrete article drive mechanism 74 to move the discrete article dispensing device 12 up or down, until the suitable position has been acquired wherein the drop off end 50 of the discrete article dispensing device 12 is at the desired height above the receiving surface of the guiding trays 13a-13e.

ii) Controlling Movement of the Dispensing Device Drive Mechanism 74 on a Basis of Information Received from a Sensor.

In accordance with a second non-limiting example of implementation, the control entity 60 is operative for controlling the movement of the dispensing device drive mechanism 74 at least in part on a basis of information received from a sensor 72.

The sensor 72 (which may include one or more sensors) may be a capacitive sensor or an optical sensor that is operative for detecting at least one of a volume or a weight of at least one of the discrete articles of the load of discrete articles 40. Different types of sensors operative for obtaining readings of volume and/or weight are known in the art, and as such will not be described in more detail herein. The sensor 72 may be positioned either in proximity to the opening 32 of the receptacle 30 for obtaining sensor readings as the load of discrete articles 40 is being supplied to the receptacle 30. Or the sensor 72 may be positioned in proximity to the slot 46 for obtaining sensor readings as discrete articles exit the receptacle 30. These sensor readings that are obtained by the sensors 72 are indicative of a characteristic of at least one of the discrete articles of the load of discrete articles 40.

The sensor 72 may also be a scale that is operative for obtaining a reading of the weight of the receptacle. In this manner, the sensor 72 may take a reading of the weight of the receptacle after an initial load of discrete article 40 has been placed within the receptacle 30. As mentioned previously, the weight of a pre-established load of discrete articles (such as 10,000 discrete articles) may be considered as a characteristic of at least one of the discrete articles of the load of discrete articles 40.

Any sensor 72 that is operative for obtaining a reading indicative of a characteristic of at least one of the discrete articles of the load of discrete article 40 is included within the present invention. These sensor readings that are indicative of a characteristic of at least one of the discrete articles are passed from the sensor 72 to the input 62 of the control entity 60, which are in turn passed to the processing entity 64. The processing entity is then operative for processing the information indicative of the characteristic of at least one of the discrete articles in the same manner as described above with respect to steps 102 and 104, for causing the discrete article dispensing device to acquire the suitable position for the given type of discrete articles being processed.

The Vibration Trays 14a-14e

As described above, the discrete article dispensing device 12 is operative for receiving an initial load of discrete articles, and for releasing those discrete articles onto the guiding trays 13a-13e, which in turn, supply those discrete articles onto the vibration trays 14a-14e.

In the non-limiting embodiment shown in FIG. 1, the container-filling machine 10 of the present invention includes five vibration trays 14a-14e, with one guiding tray and one vibration tray for each of the containers 30 to be filled. Positioned beneath the vibration trays 14a-14e are vibration imparting devices 82 for imparting vibrational motion to the vibration trays 14a-14e. Although not shown in FIGS. 2A and 2B, there are a total of five vibration imparting devices 82, with one vibration imparting device 82 positioned beneath each one of the five vibration trays 14a-14e respectively. Each of the vibration trays 14a-14e is in communication with its own vibration imparting device 82 such that the vibrational motion of each vibration tray 14a-14e may be controlled independently. These vibration imparting devices 82 may comprise either electromagnetic drive units, pneumatic drive units or mechanical drive units, among other possibilities, that are attached to spring systems (not shown), and/or resilient plates (not shown) for transmitting vibrational motion to the vibration trays 14a-14e. The control of this vibrational motion will be described in more detail below.

Figure 6:
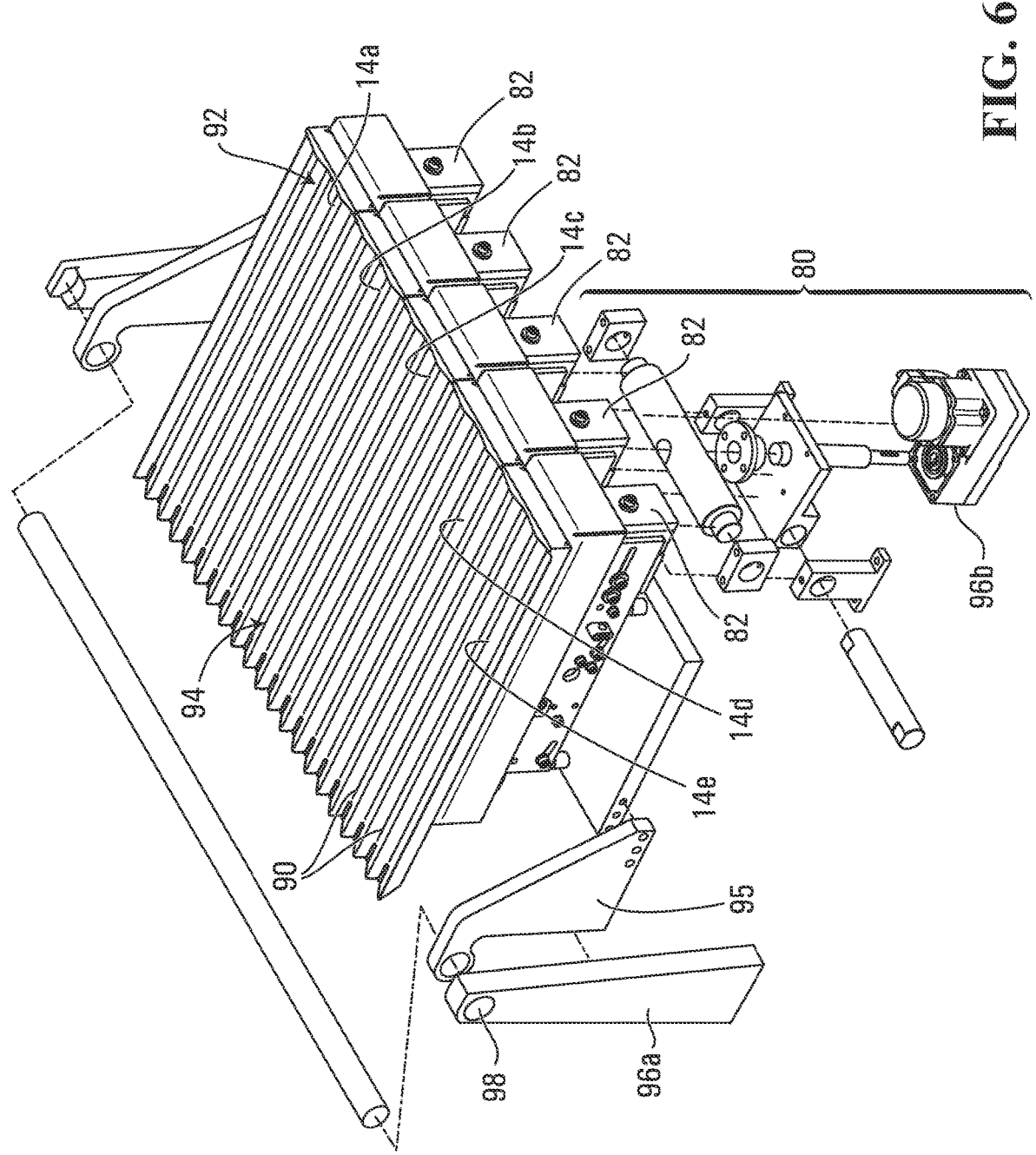
FIG. 6 shows an exploded view of a non-limiting example of a vibration tray suitable for use in the container filling machine 10 of FIG. 1.

Shown in FIG. 2A is a side view of vibration tray 14e and shown in FIG. 6 is an exploded perspective view of the vibration trays 14a-e. In examples shown, each vibration tray 14a-e comprises four channels 90 for transporting discrete articles towards the guiding paths 16. The four channels 90 are each substantially V-shaped. However, other shapes of channels are also included within the scope of the present invention. For example, the channels 90 may be U shaped, or have flat bottoms, among other possibilities.

In accordance with an optional embodiment, each of the channels 90 includes a wall-portion (not shown) that extends along a longitudinal length of the channel 90 for dividing the channel 90 into a first side and a second side. As such, the wall portion creates two discrete article receiving paths within each channel 90. A more detailed description of vibration trays that comprise wall portions for dividing each channel may be found in U.S. Patent Publication 2009/0255948.

Given that each of the five vibration trays 14a-14e includes four channels 90, the container filling machine 10 comprises a total of twenty channels 90, with each channel 90 leading into a respective one of the guiding paths 16. As such, in the non-limiting embodiment shown, there is a one-to-one ratio between channels 90 and guiding paths 16. It should, however, be appreciated that in an alternative embodiment, each of the vibration trays 14a-14e could include any number of channels 90 without departing from the spirit of the invention. In addition, two or more of the channels 90 could supply discrete articles to a single guiding path 16. As such, it is not required that there is a one-to-one ratio between channels 90 to guiding paths 16.

Each of the vibration trays 14a-14e comprises a discrete article receiving end 92, and a discrete article drop-off end 94. The discrete article receiving ends 92 receive the discrete articles from the guiding trays 13a-13e (or directly from the discrete article dispensing device 12 in the case where guiding trays 13a-13e are not included). Once received, the discrete articles travel along the channels 90 of the vibration trays 14a-14e towards the discrete article drop-off ends 94. The discrete articles are then provided to the guiding paths 16 of the container filling machine 10 from the discrete article drop-off ends 94. Through the vibrational motion of the vibration trays 14a-14e, the discrete articles are caused to travel along the channels 90 from the discrete article receiving ends 92 to the discrete article drop-off ends 94. By adjusting the slope of the vibration trays 14a-14e, the speed at which different types of discrete articles travel along the channels 90 may be adjusted. For example, by increasing the slope of the vibration trays 14a-14e, the speed at which a given type of discrete article travels along the channels 90 also increases. Therefore, in order to obtain a desired speed at which a given type of discrete article travels from the discrete article receiving end 92 to the discrete article drop-off end 94, the slope of the vibration trays 14a-14e may be adjusted.

In use, the vibration trays 14a-14e are positioned with a downward incline or slope towards the guiding pathways 16. In the non-limiting example shown in FIG. 2A, the vibration trays 14a-14e have a relatively small slope, whereas in the non-limiting example shown in FIG. 2B, the vibration trays 14a-14e have been adjusted to acquire a much steeper slope. In general, the greater this incline or slope, the faster a common type of discrete article will travel from the discrete article receiving end 92 towards the discrete article drop-off end 94.

In order to be supported between the discrete article dispensing device 12 and the guiding paths 16, the vibration trays 14a-14e are connected to one or more tray supporting frames 96. The tray supporting frames 96 support the vibration trays 14a-14e and allow the slope of the trays 14a-14e to be adjusted. In the embodiment shown in FIGS. 2A, 2B and 6, the five vibration trays 14a-14e are all supported by the same tray supporting frame 96. However, in alternative embodiments, each of the vibration trays 14a-14e may be supported by a separate supporting frame 96, such that the slope of each vibration tray may be adjusted individually.

In the embodiment shown, the vibration trays 14a-14e all sit on a common plate 97 that it connected to the tray supporting frame 96 at three positions, as will be described below. The vibration trays 14a-14e may be affixed to the plate 97 via any manner known in the art, such as via bolts, some other form of mechanical fastener or adhesives, among other possibilities. The tray supporting frame 96 comprises a first portion 96a that comprises a pivot axis 98. The common plate 97 is connected at either end of the pivot axis 98 via two connecting plates 95. As such, the plate 97 that supports the vibration trays 14a-14e is adjustable about the pivot axis 98 such that the slope of the vibration trays 14a-14e may be adjusted. Accordingly, the pivot axis 98 is substantially perpendicular to the longitudinal axes of the channels 90 along which the discrete articles travel.

In the non-limiting embodiment shown in FIGS. 2A and 2B, the pivot axis 98 of the tray supporting frame 96 is positioned towards the front of the vibration trays 14a-14e, such that it is in proximity to the drop-off ends 94 of the vibration trays 14a-14e. It should, however, be appreciated that in alternative embodiments, the pivot axis 98 may be located anywhere along the length (from the discrete article receiving end 92 to the discrete article drop-off end 94) of the vibration trays 14a-14e.

The tray supporting frame 96 further comprises a second component 96b that supports the vibration trays 14a-14e and causes the vibration trays 14a-14e to be adjustable about the pivot axis 98. The second component 96b is operative for causing the position of the vibration trays 14a-14e to be adjusted and for holding the vibration trays 14a-14e in multiple different positions such that the vibration trays 14a-14e are able to provide different slopes to the discrete articles that are filling the containers 30.

In a first non-limiting example, the vibration trays 14a-14e are manually adjustable about the pivot axis 98 for changing the slope provided by the vibration trays 14a-14b. In such a circumstance, the second component 96b may comprise a variety of different slots for receiving an associated pin attached to the vibration trays 14a-14e, such that when the pin is positioned within a different slot, the vibration trays 14a-14e are positioned to provide a different slope. Any other mechanical supporting structure that would allow a user to manually adjust the slope provided by the vibration trays 14a-14e is also included within the scope of the present invention. For example, a manually rotatable rack and pinion gear arrangement that is able to provide translational motion could be used.

In a second non-limiting example, which is shown in the Figures, the adjustment of the vibration trays 14a-14e may be automated. In such an embodiment, the second component 96b of the tray supporting frame 96 further comprises a tray supporting drive mechanism 80 that is operative for receiving command signals for causing one or all of the trays 14a-14e to be adjusted about the pivot axis 98 for acquiring a new slope. More specifically, the tray supporting drive mechanism 80 is operative for tilting the vibration trays 14a-14e about the pivot axis 98 for causing the vibration trays 14a-14e to acquire a new slope. The adjustment of the vibration trays 14a-14e may be performed on a basis of user input information or an input received from a sensor, as will be described in more detail below.

The tray supporting drive mechanism 80 may be implemented in a variety of different manners. In accordance with a first non-limiting example, the tray supporting drive mechanism 80 comprises an electrical motor that is in communication with a mechanical gear arrangement 102, as shown in FIG. 6. The mechanical gear arrangement 102 may comprise one or more rack and pinion gears, screw gears or helical gears for enabling an up-and-down movement that will cause one or more of the vibration trays 14a-14e to tilt about the pivot axis 98 for acquiring a new slope. In a second non-limiting example, the tray supporting drive mechanism 80 comprises one or more hydraulic or pneumatic cylinders together with pump actuators for causing the cylinders to expand and contract in order to adjust the tilt of the vibration trays 14a-14e about the pivot axis 98.

In the non-limiting embodiment shown, the plate 97 that supports the vibration trays 14a-14e is connected to the tray supporting frame 96 at three locations. Namely, on either side of the pivot axis 98 and at a third location that is in communication with the tray supporting drive mechanism 80. For example, the plate 97 is connected to the motorized drive mechanism 80, such that when the drive mechanism 80 is activated, the plate 97, which supports the vibration trays 14a-14e, pivots about the pivot axis 98. The drive mechanism 80 may include a motorized adjustment screw that is mounted to a shaft that is in contact with the plate 97 at a mid-point of the plate 97, or at multiple points along the length of the plate 97. In order for the motor to overcome relatively significant friction, a gearbox having a ratio of 80:1 to 120:1 may be used.

In the case where the container filling machine 10 is intended to be used to process discrete articles of different sizes and shapes, it makes sense for the slope of the vibration trays 14a-14e to be adjustable, so as to better control the speed at which the container filling machine 10 is able to fill the containers 30. At a given slope, discrete articles of a relatively small size may move at a reasonably good speed, but at that same slope, discrete articles having a larger size may not move fast enough. Therefore, in order to increase the speed of these larger size discrete articles, the slope of the vibration trays 14a-14e can be increased. In this manner, by adjusting the slope of the vibration trays 14a-14e, the desired speed at which different types of discrete articles are handled can be better controlled. As mentioned above, the adjustment of the slope of the vibration trays 14a-14b may be done manually or may be automated via a tray supporting drive mechanism 80 that causes the slope to be adjusted.

Figure 7:
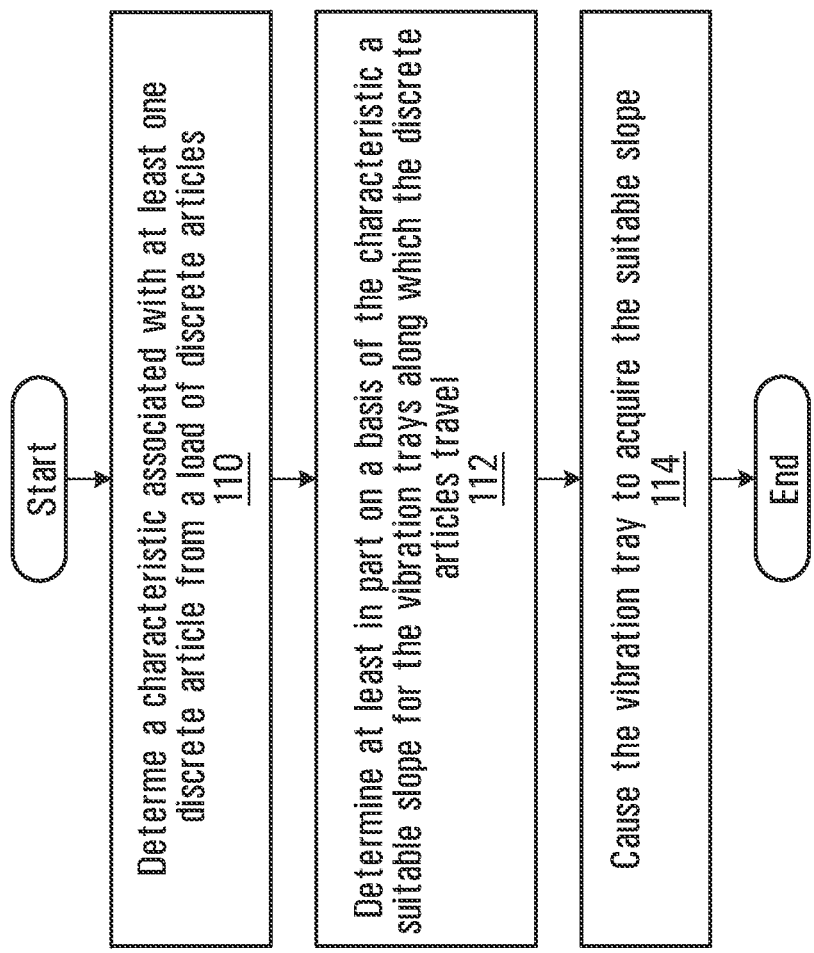
FIG. 7 shows a flow diagram of a non-limiting method of causing the vibration tray according to the present invention to acquire a given slope.

The manner in which the slope of the vibration trays 14a-14e may be adjusted will now be described in more detail with respect to the block diagram of FIG. 4 and the flow diagram of FIG. 7. As shown in FIG. 4, a control entity 60 is in communication with the tray supporting drive mechanism 80 that is operative for causing the slope of the vibration trays 14a-14e to be adjusted. As described above, the tray supporting drive mechanism 80 generally comprises an electrical motor in order to impart motion to mechanical components that cause the vibration trays 14a-14e to tilt about the pivot axis 98 for adjusting the slope provided by the vibration trays 14a-14e.

As mentioned previously, the control entity 60 comprises an input 62 for receiving commands and/or information from a user interface 76 and/or a sensor 72 (optional). The control entity 60 further comprises a processing entity 64 in communication with a memory 66. The memory comprises data 68 and program instruction 70 for being accessed and executed by the processing entity 64 for implementing the functionality that will be described in more detail below.

The control entity 60 may be a dedicated control entity for controlling the movement of the vibration trays 14a-14e via the tray supporting drive mechanism 80, or alternatively, the control entity 60 may be in communication with other components, such as the dispensing device drive mechanism 74, as described above, for controlling the functionality of these components as well.

In accordance with a first non-limiting example of implementation, the control entity 60 is operative for controlling the movement of the tray supporting drive mechanism 80 at least in part on a basis of information entered by a user via the user interface 76. In accordance with a second non-limiting example of implementation, the control entity 60 is operative for controlling the movement of the tray supporting drive mechanism 80 at least in part on a basis of information received from a sensor 72. Each of these different scenarios will be described in more detail below.

i) Controlling Movement of the Tray Supporting Drive Mechanism 80 on a Basis of Information Entered by a User.

As previously mentioned, the user interface 76 comprises user operable inputs 78 for enabling a user to provide information, such as commands, to the control entity 60. The user operable inputs 78 may be buttons, levers, toggles or any other sort of mechanical input operable by a user and known in the art. The user interface 76 may also be a graphical user interface that comprises a display screen 84. In the case of a graphical user interface, the user operable inputs 78 may include user input elements displayed on the display screen that are operable by "clicking" on the user input elements via an input device such as a mouse, a stylus pen, a touch sensitive screen or a ball mechanism.

The control entity 60 may receive information from a user via the user interface 76 indicative of one or more command signals for causing the control entity 60 to cause an adjustment in the slope of the vibration trays 14a-14e. For example, a user may operate one or more of the user operable inputs 78 in order to provide a command signal to the control entity 60, indicative that the slope of the vibration trays 14a-14e should be increased. This may be done by pushing an up/down lever into an "up" position, for providing a signal indicative that the vibration trays 14a-14e should tilt upwards so as to increase their slope. So long as the user is activating the user operable input to provide an "up" command signal, or until a user provides a "stop" command signal, the processing entity 64 will issue control signals to the tray supporting drive mechanism 80, for causing the vibration trays 14a-14e to tilt upwardly to increase the slope. Similarly, a user may operate one or more of the user operable inputs 78 in order to provide a signal indicative that the slope of the vibration trays 14a-14e should be decreased. So long as the user is activating a "down" user operable input, or until a user stops the downwards movement by providing a "stop" input, the processing entity 64 will issue control signals to the tray supporting drive mechanism 80, for causing the vibration trays 14a-14e to tilt downwardly to decrease their slope.

In an alternative embodiment, a user may enter, via the user interface 76, an indication of a desired slope at which the vibration trays 14a-14e should be positioned. This may be done by using a keypad in order to enter a slope angle such as 30°. Upon receipt of this input angle, the control entity 60 may issue a signal to the tray supporting drive mechanism 80 instructing the tray supporting drive mechanism 80 to cause the vibration trays 14a-14e to acquire a slope wherein the vibration trays 14a-14e are at a 30° angle in relation to a horizontal plane.

Regardless of the manner in which a user provides information for causing the control entity 60 to cause an adjustment in the slope of the vibration trays, the vibration trays 14a-14e may be adjustable so as to acquire any slope between being substantially parallel to the ground and substantially perpendicular to the ground. However, in an alternative embodiment, the vibration trays 14a-14e may be able to acquire only two or more pre-defined positions in which the vibration trays 14a-14e provide different pre-defined slopes. In such an embodiment, the user interface 76 may provide one or more user-operable inputs 78 suitable for causing the vibration trays 14a-14e to acquire these pre-defined positions. For example, by actuating a "pre-set one" button, the vibration trays 14a-14e may automatically acquire a first pre-defined position, and by actuating a "pre-set two" button, the vibration trays 14a-14e may automatically acquire a second pre-defined position. Any number of predefined positions are possible. The pre-defined positions may be pre-programmed into the container filling machine by a manufacturer, be part of a software download, or may be programmable by a user of the container filling machine for establishing pre-defined "favorite" positions.

In the above manner, a user may interact with the user interface 76 in order to position the vibration trays 14a-14e at a desired slope between the discrete article dispensing device 12 and the guiding paths 16. A desirable slope for the vibration trays 14a-14e would be known by a person of skill in the art, and may be based, at least in part, upon criteria such as the size and shape of the discrete articles being handled, the frequency of vibration of the vibration trays 14a-14e and the rate at which the discrete article dispensing device 12 supplies discrete articles to the guiding trays 13a-13e, and in turn, the vibration trays 14a-14e.

In accordance with a second non-limiting example, the control entity 60 may receive information from a user via the user interface 76 indicative of a characteristic associated with at least one discrete article from the load of discrete articles 40 being handled, and cause the position of the slope of the vibration trays 14a-14e to be adjusted on a basis of that received information. The manner in which this is done will be described in more detail with reference to the flow chart of FIG. 7.

At step 110, the control entity 60 receives from a user, information indicative of a characteristic of at least one discrete article from the load of discrete articles 40 being handled. As previously indicated, the characteristic may be indicative of an identifier of the discrete articles, such as the name of the discrete article, a serial number associated with the discrete article or, in the case where the discrete articles are pharmaceutical pills, the generic chemical compound of the pills. The characteristic could also be the weight of an individual discrete article, the volume of an individual discrete article, the shape of an individual discrete article, the diameter of an individual discrete article or any other physical characteristic of a discrete article. The characteristic could also be associated with the entire load of discrete articles 40 being handled, such as the weight of the load of discrete articles 40, the volume of the load of discrete articles 40 or a batch number of the load of discrete articles. This information indicative of a characteristic is received at the input 62 from the user interface 76, and is then passed to the processing entity 64.

At step 112, the processing entity 64 may the determine, at least in part on a basis of the information indicative of a characteristic of at least one discrete article, a suitable slope for the vibration trays 14a-14e. This determination may be done in a variety of manners. For example, the determination may be done on a basis of a look-up function using a database that is stored in the data 68 of the memory 66. The database may comprise a list of characteristics that could be provided by a user, and associated with each characteristic is a corresponding slope for the vibration trays 14a-14e. For example, in the case where the information indicative of a characteristic of at least one discrete article is a name or other identifier of the discrete articles, the processing entity 64 may access the database and look for an entry that matches the characteristic entered by the user. Once the processing entity 64 has found the entry in the database that matches the information indicative of a characteristic input by the user, the processing entity 64 would then determine the corresponding slope that is contained in the entry for the matching characteristic.

The database may be provided by a manufacturer of the container filling machine 10, or may be slowly established/built by a user of the container filling machine 10 over time. For example, each time a user has determined (possibly through trial-and-error) a suitable slope for the vibration trays 14a-14e when handling a given type of discrete article, the user may save a record within the memory 66 in order to store in connection with one or more characteristics of the discrete article (such as its weight, shape, volume, name and/or serial number) an associated slope for the vibration trays 14a-14e when handling that given type of discrete article.

Alternatively, the determination of a suitable slope may be done by executing a pre-established algorithm. The pre-established algorithm may be stored within the program instructions 70 of the memory 66. For example, in the case where the information indicative of a characteristic of at least one discrete article is a weight or volume of a discrete article, the processing entity 64 may access the pre-established algorithm stored in the memory, for applying the entered weight or volume into the pre-established algorithm. By running the algorithm at least in part on a basis of the entered characteristic (such as the weight or volume), the output of the algorithm may provide a suitable slope for the discrete article vibration trays 14a-14e. In order to obtain the output of the algorithm, other values may need to be input into the algorithm, such as the frequency of vibration of the vibration trays 14a-14e and the desired speed at which the containers are to be filled.

Once a suitable slope for the vibration trays 14a-14e has been determined, at step 114, the processing entity 64 is operative for causing the tray supporting drive mechanism 80 to move the vibration trays 14a-14e into the determined slope. This may be done by issuing one or more control signals to the tray supporting drive mechanism 80, for instructing the tray supporting drive mechanism 80 to tilt the vibration trays 14a-14e up or down, until the suitable slope has been acquired.

ii) Controlling Movement of the Tray Supporting Drive Mechanism 80 on a Basis of Information Received from a Sensor.

In accordance with a second non-limiting example of implementation, the control entity 60 is operative for controlling the movement of the tray supporting drive mechanism 80 at least in part on a basis of information received from a sensor 72.

The sensor 72 (which may include one or more sensors) may be a capacitive sensor or an optical sensor that is operative for detecting at least one of a volume or a weight of at least one of the discrete articles of the load of discrete articles 40. Different types of sensors operative for obtaining readings of volume and/or weight are known in the art, and as such will not be described in more detail herein. The sensor 72 may be positioned either in proximity to the opening 32 of the receptacle 30 for obtaining sensor readings as the load of discrete articles 40 is being supplied to the receptacle 30. Or the sensor 72 may be positioned in proximity to the slot 46 for obtaining sensor readings as discrete articles exit the receptacle 30. These sensor readings that are obtained by the sensors 72 are indicative of a characteristic of at least one of the discrete articles of the load of discrete articles 40.

The sensor 72 may also be a scale that is operative for obtaining a reading of the weight of the load of discrete articles 40 that have been placed within the receptacle 30. In this manner, the sensor 72 may take a reading of the weight of the receptacle 30 after an initial load of discrete article 40 has been placed within the receptacle 30. As mentioned previously, the weight of a pre-established load of discrete articles (such as a load of 10,000 discrete articles) may be considered as a characteristic of at least one of the discrete articles of the load of discrete articles 40.

Any sensor 72 that is operative for obtaining a reading indicative of a characteristic of at least one of the discrete articles of the load of discrete articles 40 is included within the present invention. These sensor readings that are indicative of a characteristic of at least one of the discrete articles are passed from the sensor 72 to the input 62 of the control entity 60, which are in turn passed to the processing entity 64. The processing entity is then operative for processing the information indicative of the characteristic of at least one of the discrete articles in the same manner as described above with respect to steps 112 and 114, for causing the tray supporting drive mechanism 80 to cause the vibration trays 14a-14e to acquire the determined slope.

With reference to FIGS. 2A and 2B, it can be seen that as the slope of the vibration trays 14a-14e increase, the height of the receiving ends 92 of these trays also increase in relation to the guiding trays 13a-14e. As such, as the vibration trays 14a-14e are caused to acquire a greater slope, the height of the guiding trays 13a-13e also needs to be increased such that the guiding trays 13a-13e are still able to supply discrete articles from the discrete article dispensing device 12 to the vibration trays 14a-14e. In addition, the guiding trays 13a-13e may also need to be moved laterally forward towards the vibration trays 14a-14e, so as to prevent a gap from being formed between the vibration trays 14a-14e and the guiding trays 13a-13e.

In order to adjust the height of the guiding trays 13a-13e, the guiding trays may be positioned on a supporting stand 108 that is able to increase and decrease the height of the guiding trays 13a-13e. The supporting stand 108 may include a mechanical rack and pinion gear arrangements, pneumatic or hydraulic pistons or any other mechanical device suitable for increasing the height of the guiding trays 13a-13e. The height of the supporting stand 108 can be adjusted manually or can be automated.

In the case where the height adjustability of the supporting stand is automated, it is possible that the control entity 60 that adjusts the slope of the vibration trays 14a-14e is able to simultaneously cause a drive mechanism to adjust the height of the guiding trays 13a-13e. In accordance with a non-limiting embodiment, stored within the memory 66 are records in which an appropriate height for the guiding trays 13a-13e is associated with each possible slope for the vibration trays 14a-14e. As such, on the basis of a suitable slope for the vibration trays 14a-14e, the guiding trays 13a-13e can be caused to acquire a corresponding suitable height.

The Path Blocking Device 24

Once the discrete articles have left the vibration trays 14a-14e, they continue travel along guiding paths 16 towards the containers 30. The containers 30 are typically intended to be filled with a pre-determined number of discrete articles, such as 100 or 150 discrete articles, for example. As the discrete articles travel along the guiding paths 16, they pass through a counting device 22 that counts the number of discrete articles that have passed there through. In this manner, once the counting device has detected a pre-determined number of discrete articles that have passed through one or more of the paths 16 leading to a given container 30, one or more of the path blocking devices 24 located in a path 16 leading to that container 30 is caused to close, such that no further discrete articles pass by the closed path blocking devices 24. In this manner, once a container has received the pre-determined number of discrete articles, no further discrete articles enter the container 30 until the filled container 30 has been moved out of the way, and a new container 30 has been moved into place.

As described above, multiple ones of the guiding paths 16 may lead into a single container 30. In the non-limiting embodiment shown in FIG. 8, four guiding paths 16 lead into a funnel 26 that directs the discrete articles into a single container 30. It should, however, be appreciated that any number of paths 16 could lead into any number of containers 30, without departing from the spirit of the invention.

As mentioned above, prior to entering the containers 30, the discrete articles pass through a counting device 22. The purpose of the counting device 22 is to obtain a count of the discrete articles in order to ensure that the proper pre-determined number of discrete articles enter each container 30. A more detailed discussion of a counting device 22 can be found in issued U.S. Pat. No. 7,956,623.

Figure 8:
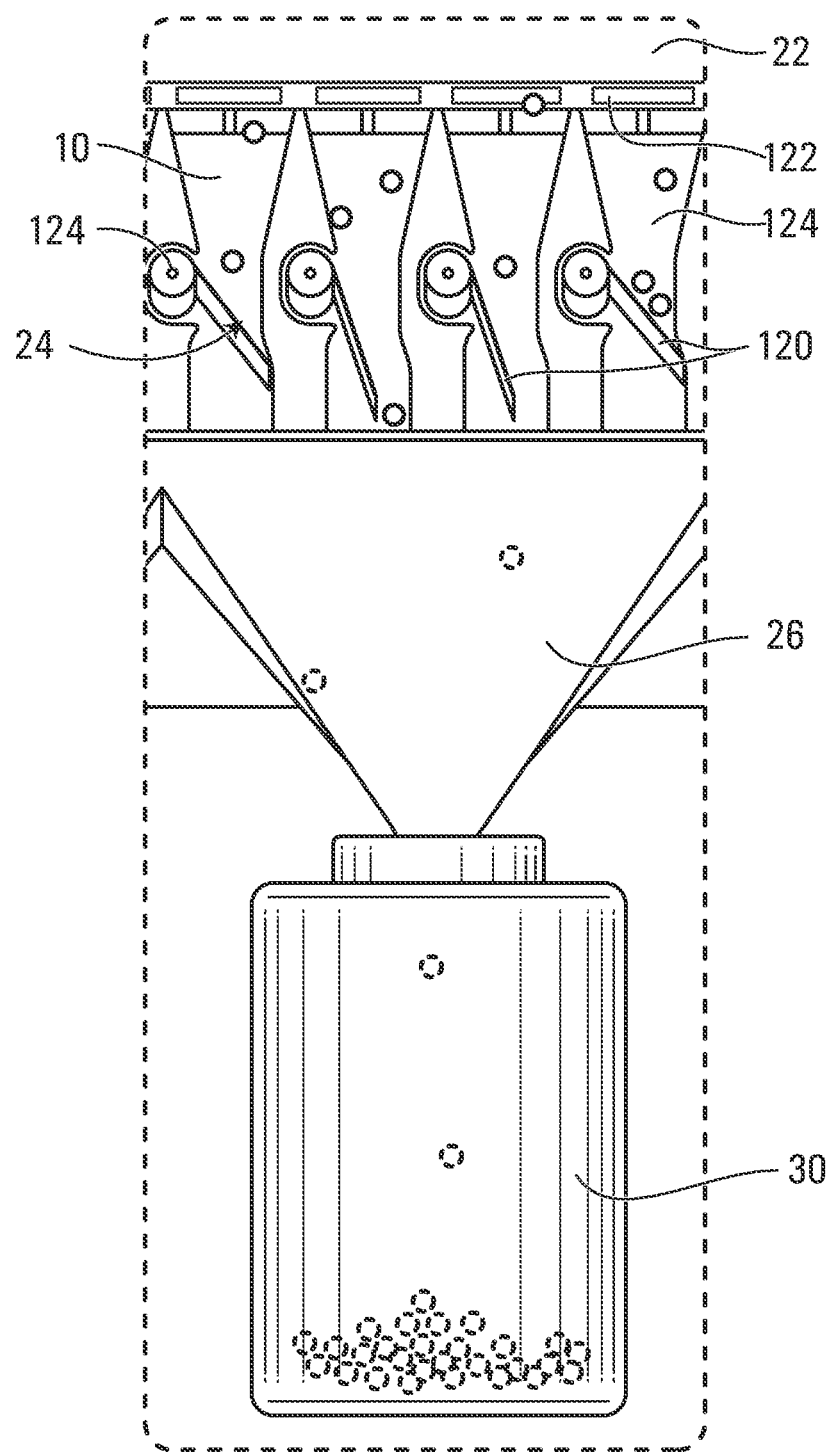
FIG. 8 shows a blown up view of a bottom portion of the container filling machine of the container filling machine of FIG. 1.

As shown in FIG. 8, the counting device 22 includes passageways 122 associated with each guiding path 16, through which the discrete articles travel. Included within each passageway is circuitry for enabling the counting device to obtain a count of a discrete article passing there through. In addition, and as shown in FIG. 4, the counting device 22 is in communication with a processing entity 64. The processing entity 64 may be part of a control entity 60 that controls the functionality of multiple components of the container filling machine 10. However, in an alternative embodiment, the counting device 22 may be in communication with a processing entity that is dedicated to controlling the functionality of the counting device 22.

In a non-limiting embodiment, the processing entity 64 is operative for simultaneously receiving and processing signals from the counting circuitry of each one of the passageways 122 of the counting device 22. For example, in the case shown in FIG. 8, the processing entity 64 is operative to receive signals from four separate passageways 122 at approximately the same time. In such a case, the circuitry associated to each passageway 16 is operative for providing identification information to the processing entity 64, such that the processing entity 64 is able to keep an appropriate count of the discrete articles for personal treatment passing through each respective passageway 122 of the counting device 22.

The circuitry contained within each passageway 122 may be any suitable circuitry for detecting when a discrete article for personal treatment passes through the passageway 91. For example, the counting device 22 may include optical circuitry or capacitance circuitry without departing from the spirit of the invention. Once the circuitry detects that an object, such as a discrete article, has passed through the passageway 122, a signal is sent to the processing entity 64, such that the processing entity 64 can keep a count of the number of discrete articles that have passed through each passageway 122.

The purpose of the counting device 22 is to help control the number of discrete articles entering each container 30.

As shown in FIG. 8, positioned between the counting device 22 and a container 30 are a plurality of path blocking devices 24; namely one path blocking device 24 for each one of the guiding paths 16. Each one of the guiding paths 16 then feeds into a funnel 26 which, in turn, leads into a container 30.

In combination with the counting device 22, the path blocking devices 24 are operative for controlling the number of discrete articles that enter each container 30. More specifically, the path blocking devices 24 are operative to move between an open position and a closed position in order to either permit the travel of discrete articles into the container 30 or block the travel of discrete articles into the container 30. In the embodiment shown in FIG. 8, the right-most path blocking device 24 is in a closed position, wherein the discrete articles travelling along that guiding path 16 are prevented from travelling into the container 30. Whereas, the two middle path blocking devices 24 are in an open position, such that the discrete articles travelling along those guiding paths 16 are able to travel past the path blocking devices 24 into the container 30.

Referring back to FIG. 4, the path blocking devices 24 are also in communication with the processing entity 64, such that the processing entity 64 can control the movement of the path blocking devices 24 between the open position and the closed position. As shown in FIG. 4, the path blocking devices 24 are in communication with a processing entity 64 that is also in communication with the counting device 22, as well as the other components in the container filling machine. It should be appreciated however that a processing entity 64 dedicated to the control of the path blocking devices 24 could also be used without departing from the spirit of the invention. In such a case, the processing entity 64 would be operative for receiving information from the counting device 22 indicative of a count of the number of discrete articles for personal treatment passing through respective passageways 122.

In operation, the processing entity 64 controls the movement of the path blocking devices 24 at least in part on the basis of information received from the counting device 22 and the pre-determined number of discrete articles that are to be supplied to each container 30. The information received from the counting device 22 is generally indicative of the number of discrete articles that has passed through each passageway 122 of the counting device 22. The processing entity 64 processes this information in accordance with program instructions 70 stored in the memory 66. Such program instructions may include a specific algorithm, such that the control of the path blocking devices 24 is performed in accordance with the specific algorithm. For example, the predefined algorithm may specify that once a pre-determined number of discrete articles has passed through a given guiding path 16, the path blocking device 24 associated with that guiding path 16 is to be closed. For example, in the case where each container 30 is to be filled with one hundred discrete articles and there are four guiding paths 16 leading into each container 30, the algorithm may specify that each path blocking device 24 is to be closed after twenty five discrete articles for personal treatment have passed by each path blocking device 24. Alternatively, three of the path blocking devices 24 may close after twenty four discrete articles have passed along their respective guiding path 16, and the fourth path blocking device 24 may close after twenty eight discrete articles have passed there through. In this way, the fourth path blocking device 24 is able to more precisely monitor the final discrete articles entering the container 30. It should be appreciated that any algorithm suitable for controlling the number of discrete articles that enter each container 30 is included within the scope of the present invention and that a variety of different algorithms could be used in order to control the functioning of the path blocking devices 24.

In the non-limiting embodiment shown in FIG. 8, the path blocking devices 24 are in the form of gates 120 that pivot about a pivot point 124 mounted to one side of the paths 16. The gates 120 pivot about the pivot point 124 in order to move between the open position and the closed position. In the closed position, the gates 120 form physical barriers that span across the width of a guiding path 16. Whereas in the open position, the gates 120 are positioned along the sides of the guiding paths 16 such that discrete articles can pass by the gates 120 unobstructed and travel into a container 30.

When in the closed position, the path blocking devices 24 are able to prevent discrete articles for personal treatment from continued travel into the funnels 26 while the filled containers 30 are being replaced with new containers 30. Once a container 30 has been filled with the pre-determined number of discrete articles, all of the path blocking devices 24 that are positioned along the paths 16 that lead to that container 30 are closed such that the filled containers can be removed and replaced with new containers without stopping the flow of discrete articles through the counting device 22 of the container filling machine 10. As such, the discrete articles simply accumulate at the path blocking devices 24 against the closed gates 120. When the new containers 30 are in place underneath the funnels 26, the path blocking devices 24 open, and the discrete articles for personal treatment that have accumulated at the gates 120 enter the new containers. In this manner, the flow of discrete articles for personal treatment does not slow down or stop for a container change.

Figure 9:
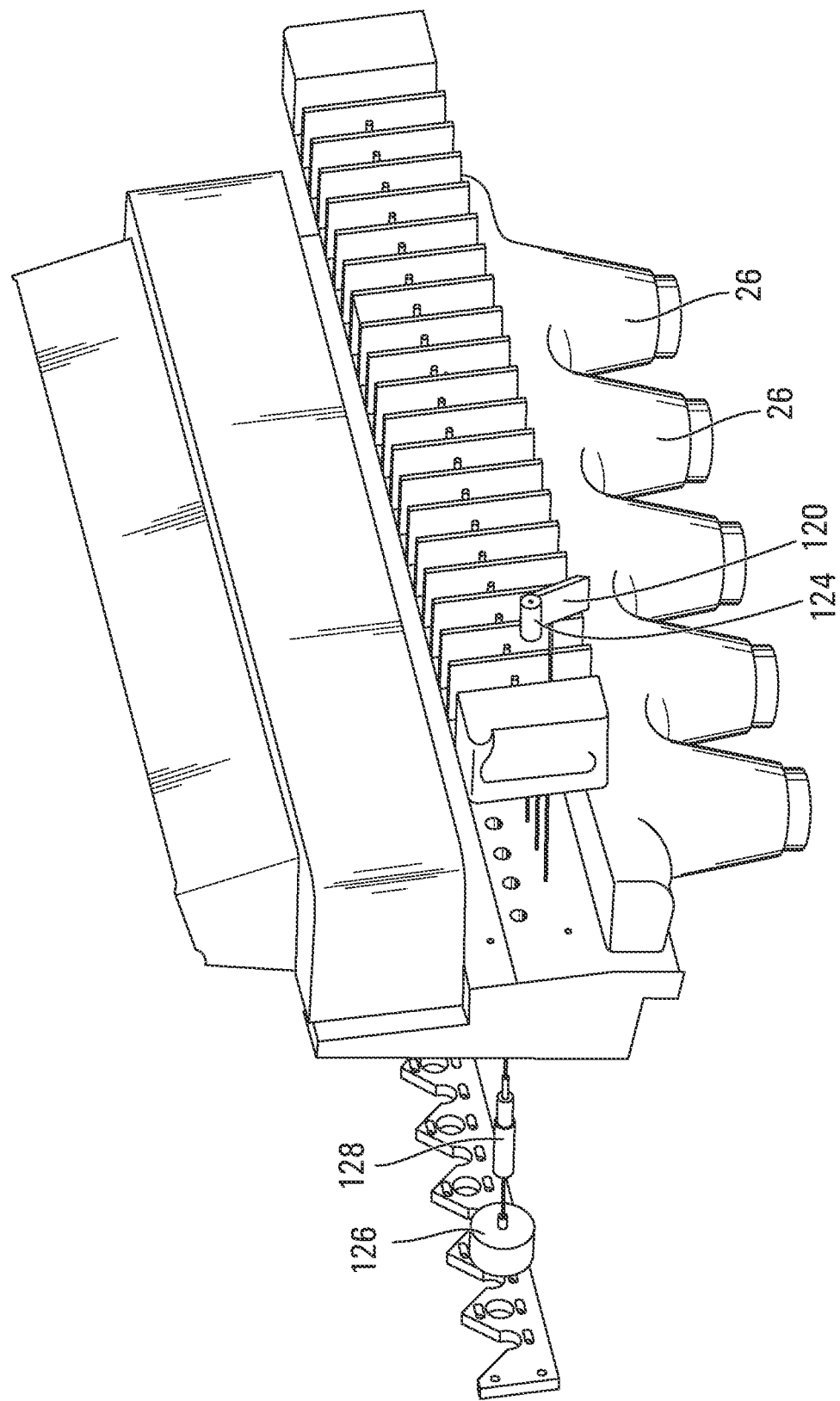
FIG. 9 shows an exploded view of a non-limiting example of implementation the path blocking gates according to the present invention.

In accordance with a non-limiting embodiment of the present invention, and as shown in FIG. 9, the gates 120 are controlled by solenoid devices 126 that convert electrical energy into mechanical energy. As shown, the gates 120 are connected to solenoid devices 126 via a rotating pin 128. In the embodiment shown, the solenoid device 128 is a rotary solenoid. When electrical current is applied to, or cut from, the solenoid devices 126, the solenoid devices 126 cause the rotation of the pin 128 that in turn causes the rotation of a respective gate 120. As shown, a first end of the pin 128 is adapted for connection to the solenoid device 126 and a second end of the pin 128 is adapted for connection to a pivot axis of a gate 120. The second end of the pin 128 may fit within the pivot axis 124 of the gate 120 via a friction fit or via projections that engage with a complimentary-shaped slot within the pivot axis. For example, the pin 128 may have a star-shaped end, or an X-shaped end, that fits within a complementary slot within the pivot axis 124 of the gate 120. In this manner, as the pin 128 rotates, rotational motion is imparted to the gate 120.

When electrical current is provided to the solenoid device 126, the solenoid device 126 rotates the pin 128, such that the gate 120 moves into the closed position or the open position. When electrical current is cut from the solenoid device 126, the pin 128 returns to its original neutral position (via a spring). In accordance with a non-limiting example of implementation of the present invention, when the solenoid device 126 is at a neutral position, such that no electrical current is applied thereto, the gate 120 is positioned in the middle of the pathway 16, in this position, discrete articles are able to pass by the gate 120, but the gate is not positioned up against the side wall of the path 16 providing a completely unobstructed path 16. When the solenoid device 126 is activated by applying +5 Volts, the gate 120 moves approximately 22.5 degrees towards the opposite wall of the path 16, such that the guiding path 16 is blocked. When −5 Volts is applied, the gate 120 opens approximately −22.5 degrees for causing the gate to open. Although certain voltage values and rotation angles have been provided in the above example, it should be appreciated that these values are provided for the sake of example only, and that the present invention is not limited to these values.

Accordingly, once the control entity 64 determines, based on information from the counting device 22, that a pre-determined number of discrete articles has passed along a given one of the guiding paths 16, the control entity 64 causes electrical current to be supplied to the solenoid device 126 of the gate 120 associated with that guiding path 16, such that the gate 120 is able to acquire the closed position. Once all the gates 120 associated with a given container 30 have been closed (which means that the container has been filled with the pre-determined number of discrete articles) the filled container 30 is moved out of the way, and a new container 30 is moved into place. At that point, the control entity 64 applies electrical current to the solenoid devices 126, such that the gates 120 open up again, and the discrete articles can flow into the new container 30.

Using solenoid devices 126 to control the gates 120 prevents the use of air fluctuations, which would be required with pneumatic cylinders. In addition, solenoid devices 126 provide faster opening/closing than pneumatic cylinders. For example, a solenoid device can react in approximately 5 milliseconds, as opposed to the more typical 60 to 100 milliseconds required by a pneumatic cylinder. In addition, solenoid devices are often more durable and constant than pneumatic cylinders, and may also be cleaner as they do not necessarily require any oil or other lubrication.

In a preferred embodiment, the functionality of the components of the container filling machine 10 described above (i.e. the functionality of the discrete article dispensing device 12, the guiding trays 13a-13e, the vibration trays 14a-14e, and the tray supporting drive mechanism 80) are controlled via one or more computing units that include at least one software driven processing unit. However, in some embodiments of the invention, all or part of the functionality of these components may be implemented as pre-programmed hardware or firmware elements (e.g., application specific integrated circuits (ASICs), electrically erasable programmable read-only memories (EEPROMs), etc.) or other related components.

Although the present invention has been described in considerable detail with reference to certain preferred embodiments thereof, variations and refinements are possible without departing from the spirit of the invention. Therefore, the scope of the invention should be limited only by the appended claims and their equivalents.

What is claimed:

1. A container filling machine for filling a plurality of containers with discrete articles, the container filling machine comprising:
 a. a discrete article dispensing device for receiving a load of discrete articles;
 b. a vibration tray assembly for receiving discrete articles from the discrete article dispensing device, the vibration tray assembly, comprising:
  i. a receiving end portion configured to receive discrete articles from the discrete article dispensing device;
  ii. a drop-off edge at which the discrete articles are being released from the vibration tray assembly, the drop-off edge being spaced apart from the receiving end portion;
  iii. a sloped surface having a longitudinal extent extending from the receiving end portion to the drop-off edge, the sloped surface being continuous such that each discrete article deposited at the receiving end portion is transported to the drop-off edge and released from the drop-off edge;
  iv. a vibration imparting device for imparting vibrational motion to the sloped surface, the vibration imparting device being configured to cause displacement of the discrete articles in succession and spaced apart from each other along the continuous sloped surface and along the longitudinal extent from the receiving end portion to the drop-off edge;
  v. an adjustment device configured for adjusting a slope of the sloped surface, the adjustment device configured to vary a spacing of the discrete articles along the continuous sloped surface as each discrete article delivered from the discrete article dispensing device to the receiving end portion travels from the receiving end portion to the drop-off edge as the sloped surface is vibrated by the vibration imparting device;
 c. a guiding tray positioned between the discrete article dispensing device and the receiving end portion, the guiding tray configured to receive discrete articles dispensed from the discrete article dispensing device and guide the discrete articles toward the receiving end portion, the guiding tray being configured such that a position of the guiding tray is vertically adjustable relative to the receiving end portion to adapt the position of the guiding tray to a change of slope of the sloped surface.

2. A container filling machine as defined in claim 1, further comprising a plurality of pathways positioned adjacent the drop-off edge and being configured to receive the discrete articles discharged from the drop-off edge, the pathways configured to direct the discrete articles toward a plurality of containers.

3. A container filling machine as defined in claim 2, wherein the adjustment device is configured to vary the angular position of the sloped surface to provide any slope between substantially parallel to the ground and substantially perpendicular to the ground.

4. A container filling machine as defined in claim 2, wherein the adjustment device is configured to vary the angular position of the sloped surface between at least two predefined positions in which the sloped surface provides different slopes on which the discrete articles travel.

5. A container filling machine as defined in claim 2, wherein the sloped surface is pivotally mounted to adjust the slope of the sloped surface.

6. A container filling machine as defined in claim 5, wherein the sloped surface is pivotally mounted about a pivot axis, the pivot axis being adjacent the drop-off edge.

* * * * *